United States Patent
Eric et al.

(10) Patent No.: US 11,393,066 B2
(45) Date of Patent: Jul. 19, 2022

(54) DISPLAY SYSTEM, ELECTRONIC APPARATUS, MOBILE BODY, AND DISPLAY METHOD

(71) Applicant: Seiko Epson Corporation, Toyko (JP)

(72) Inventors: Jeffrey Eric, Richmond (CA); Tetsuo Kawamoto, Suwa (JP); Wittmeir Manfred, Aichach (DE); Yosuke Tanikawa, Zama (JP); Kumar anandabairavasamy Anand, Richmond (CA)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/137,780

(22) Filed: Dec. 30, 2020

(65) Prior Publication Data
US 2021/0201442 A1     Jul. 1, 2021

Related U.S. Application Data

(60) Provisional application No. 62/955,730, filed on Dec. 31, 2019.

(30) Foreign Application Priority Data

Jun. 17, 2020   (JP) .............................. JP2020-104225

(51) Int. Cl.
*G06T 3/00*     (2006.01)
*G06T 7/20*     (2017.01)
(Continued)

(52) U.S. Cl.
CPC .............. *G06T 3/0093* (2013.01); *G06T 7/20* (2013.01); *G09G 5/37* (2013.01); *G09G 5/38* (2013.01); *G02B 27/0101* (2013.01); *G02B 2027/014* (2013.01); *G06T 2207/30252* (2013.01); *G09G 2320/0252* (2013.01); *G09G 2320/0261* (2013.01); *G09G 2320/0285* (2013.01); *G09G 2380/10* (2013.01)

(58) Field of Classification Search
None
See application file for complete search history.

(56) References Cited

U.S. PATENT DOCUMENTS 9,746,668 B2 *   8/2017   Kim .................... G02B 27/0101
9,823,471 B2 *   11/2017   Kim ......................... B60R 1/00
(Continued)

FOREIGN PATENT DOCUMENTS

JP     2008-014757 A     1/2008
JP     2010-184589 A     8/2010
(Continued)

*Primary Examiner* — Ryan M Gray
(74) *Attorney, Agent, or Firm* — Harness, Dickey & Pierce, P.L.C.

(57) ABSTRACT

A display system (100) includes a rendering image generation unit (120), a parameter computation unit (140), and a warp processing unit (130). The parameter computation unit (140) computes a latency compensation parameter for compensating a latency including a rendering processing latency of a rendering image based on tracking information. The warp processing unit (130) performs latency compensation processing for compensating the position of a virtual object in a display region based on the latency compensation parameter.

17 Claims, 15 Drawing Sheets

(51) Int. Cl.
  *G09G 5/37*     (2006.01)
  *G09G 5/38*     (2006.01)
  *G02B 27/01*    (2006.01)

(56) References Cited

U.S. PATENT DOCUMENTS

| | | | |
|---|---|---|---|
| 10,322,672 B2 * | 6/2019 | Watanabe | B60K 35/00 |
| 10,937,345 B2 * | 3/2021 | Funabiki | G02B 27/0179 |
| 2010/0164702 A1 * | 7/2010 | Sasaki | G02B 27/01 340/438 |
| 2013/0169679 A1 | 7/2013 | Su et al. | |
| 2015/0294505 A1 | 10/2015 | Atsmon | |
| 2016/0090044 A1 | 3/2016 | Watanabe et al. | |
| 2016/0216521 A1 * | 7/2016 | Yachi | G02B 27/0179 |
| 2017/0038595 A1 * | 2/2017 | Kutomi | G09G 5/38 |
| 2017/0092169 A1 * | 3/2017 | Kuzuhara | G09G 3/007 |
| 2017/0169612 A1 * | 6/2017 | Cashen | G06T 19/20 |
| 2017/0254659 A1 | 9/2017 | Fukumoto | |
| 2018/0061129 A1 * | 3/2018 | Sisbot | G06T 19/006 |
| 2018/0143431 A1 * | 5/2018 | Matsuura | G02B 27/0093 |
| 2019/0139286 A1 * | 5/2019 | Shimoda | B60K 35/00 |
| 2019/0227675 A1 * | 7/2019 | Cramer | G06F 3/04897 |
| 2019/0235241 A1 | 8/2019 | Suzuki et al. | |
| 2019/0379841 A1 | 12/2019 | Hardy et al. | |
| 2020/0269696 A1 | 8/2020 | Banno et al. | |

FOREIGN PATENT DOCUMENTS

| | | |
|---|---|---|
| JP | 2013-020308 A | 1/2013 |
| JP | 2013-237320 A | 11/2013 |
| JP | 2015-101311 A | 6/2015 |
| JP | 2017-007481 A | 1/2017 |
| JP | 2018-058544 A | 4/2018 |
| JP | 2019-098755 A | 6/2019 |
| JP | 2019-098756 A | 6/2019 |
| JP | 2019-153237 A | 9/2019 |
| JP | 2019-179214 A | 10/2019 |

* cited by examiner

| DISPLACEMENT | COMPENSATION METHOD |
|---|---|
| YAW Δ α | HORIZONTAL SHIFT |
| PITCH Δ β | VERTICAL SHIFT |
| ROLL Δ γ | ROTATION |
| HORIZONTAL SHIFT Δ x | HORIZONTAL SHIFT |
| VERTICAL SHIFT Δ y | VERTICAL SHIFT |
| FRONT-BACK SHIFT Δ z | REDUCTION OR ZOOMING |

$$\begin{bmatrix} xsrc \\ ysrc \\ 1 \end{bmatrix} = \begin{bmatrix} m11 & m12 & m13 \\ 0 & m22 & m23 \\ 0 & 0 & 1 \end{bmatrix} \begin{bmatrix} xlat \\ ylat \\ 1 \end{bmatrix}$$

where m11 = HORIZONTAL SCALE, m12 = HORIZONTAL SKEW, m13 = HORIZONTAL SHIFT, m22 = VERTICAL SCALE, m23 = VERTICAL SHIFT.

FIG. 14

DISPLAY SYSTEM, ELECTRONIC APPARATUS, MOBILE BODY, AND DISPLAY METHOD

The present application is based on, and claims priority from U.S. Application Ser. No. 62/955,730, filed Dec. 31, 2019, and JP Application Serial Number 2020-104225, filed Jun. 17, 2020, the disclosures of which are hereby incorporated by reference herein in their entirety.

BACKGROUND

1. Technical Field

The present disclosure relates to a display system, an electronic apparatus, a mobile body, a display method, and the like.

2. Related Art

Head up displays are known that display information in a field of view of a user in a superimposed manner by displaying an image on a transparent screen or the like. As a result of combining such a head up display and the AR technology, a virtual object can be displayed by a head up display such that the virtual object tracks real objects such as a front running car and a road. AR is an abbreviation of augmented reality.

In a technique disclosed in JP-A-2019-98756, the change in orientation in a low frequency band is corrected by image processing, and the change in orientation in a high frequency band is corrected by a projection optical unit. As a result of correcting the change in orientation in the high frequency band by the projection optical unit, when the orientation of the vehicle changes, the position of a projection image is corrected such that the virtual image is displayed at a correct position relative to the real image.

In a technique disclosed in JP-A-2019-179214, a distortion correction unit prediction-calculates the correction amount to be used when a display shift correction unit in a subsequent stage corrects the display position of an image, using orientation signals that have been output from a gyro sensor in a period from a given time before until the current time and a predictor. Also, the distortion correction unit performs distortion correction on the image by again associating the display position with a display region at a position that is shifted by the predicted correction amount, and a display shift correction unit corrects the display position of the image subjected to distortion correction. As a result of the display shift correction unit correcting the display position, when the orientation of the vehicle changes, the position of a projection image is corrected such that the virtual image is displayed at a correct position relative to the real image.

In a head up display using the AR technology, a sensor output is acquired, rendering of a virtual object is performed using the sensor output, warp processing is performed on a rendering image, and the image subjected to the warp processing is displayed by the head up display. In such a display system, there is a time lag between when the sensor output to be used for rendering was sampled and when display is performed by the head up display, and therefore the movement of a vehicle or the like that occurs in this period is not reflected on the display position of the virtual object. Therefore, a position shift occurs between the rendered virtual object and the real object at the time of display, and it is desirable that such a position shift due to latency is minimized as far as possible.

SUMMARY

One aspect of the present disclosure relates to a display system of a head up display that displays, in a display region, a virtual object corresponding to a real object in the real space, the display system including: a rendering image generation unit configured to generate a rendering image including the virtual object; a parameter computation unit configured to compute a latency compensation parameter for compensating a latency including a rendering processing latency of the rendering image based on tracking information that is at least one of first tracking information of a mobile body in which the head up display is mounted, second tracking information of a viewer of the head up display, and third tracking information of the real object; and a warp processing unit configured to generate a display image to be displayed in the display region by performing warp processing in which coordinate transformation is performed on the rendering image according to a curve of the display region, wherein the warp processing unit performs, in the warp processing, latency compensation processing for compensating the position of the virtual object in the display region based on the latency compensation parameter.

Also, another aspect of the present disclosure relates to an electronic apparatus including the above-described display system.

Also, another aspect of the present disclosure relates to a mobile body including the above-described display system.

Also, yet another aspect of the present disclosure relates to a display method of a head up display that displays, in a display region, a virtual object corresponding to a real object in the real space, the display method including: generating a rendering image including the virtual object; computing a latency compensation parameter for compensating a latency including a rendering processing latency of the rendering image based on tracking information that is at least one of first tracking information of a mobile body in which the head up display is mounted, a second tracking information of a viewer of the head up display, and a third tracking information of the real object; and generating a display image to be displayed in the display region by performing warp processing in which coordinate transformation is performed on the rendering image according to a curve of the display region, wherein, in the warp processing, latency compensation processing for compensating the position of the virtual object in the display region is performed based on the latency compensation parameter.

BRIEF DESCRIPTION OF THE DRAWINGS

The disclosure will be described with reference to the accompanying drawings, wherein like numbers reference like elements.

FIG. 14 shows an example of a latency compensation parameter for realizing a compensation method.

DESCRIPTION OF EXEMPLARY EMBODIMENTS

Hereinafter, preferred embodiments of the disclosure will be described in detail. Note that the embodiments given below are not intended to unduly limit the scope of the disclosure recited in the appended claims. In addition, not all of the constituent elements described below are essential to the disclosure.

1. Display System

Figure 1:
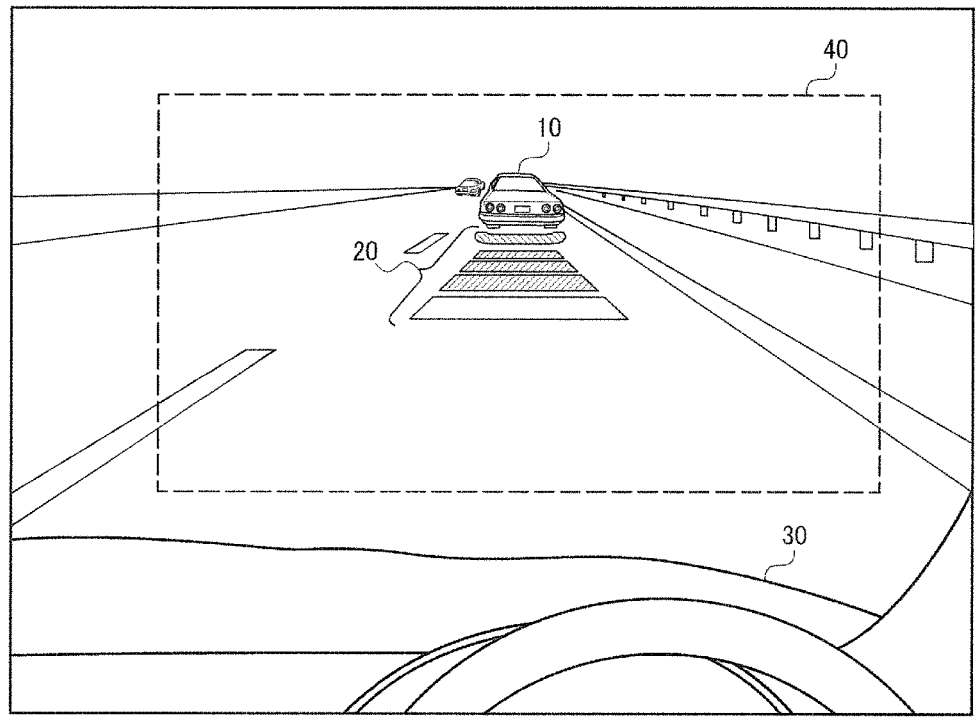
FIG. 1 shows an example of an AR display by an HUD.

FIG. 1 shows an example of an AR display performed by HUD. HUD is an abbreviation of head up display, and AR is an abbreviation of augmented reality. In the following, an example in which an HUD is mounted in an automobile 30 will be mainly described, but the HUD of the present embodiment may also be mounted in various mobile bodies such as an airplane, a ship, and a two-wheeled vehicle.

FIG. 1 shows an AR display that a driver views through the HUD. The driver views, through a windshield, a front running car 10, a road on which the front running car 10 is running, and scenery around them. Also, the driver views a virtual image that the HUD projected in a display region 40 of the windshield, and the virtual image is viewed by the driver as a virtual object 20 overlaid on a real space. The display region 40 is a range in which the HUD can project virtual images, and the virtual object 20 is displayed in this display region 40. The virtual object 20 in FIG. 1 is an AR display object, and is displayed such that the display position tracks the front running car 10 or the road. That is, the HUD tries to display the virtual object 20 such that the relative positional relationship between the front running car 10 or the road and the virtual object 20 will not change viewed from the driver.

The display system of the HUD tracks the front running car 10 or the like using a sensor such as Lidar, renders the virtual object 20 based on the tracking result, performs warp processing on the rendering image, and causes the HUD to display the image subjected to the warp processing. Here, a delay is present from the timing at which the sensor performed sampling until the timing at which the HUD displays the virtual object 20 due to tracking processing, rendering processing, warp processing, data communication, and the like. Such a delay caused by processing, communication, and the like is called as latency.

The latency may cause a position shift between the virtual object 20 and the front running car 10 or the like. That is, the position of the front running car 10 or the like when the HUD actually displays the virtual object 20 is shifted from the position of the front running car 10 or the like when the display system rendered the virtual object 20, and as a result, the virtual object 20 is displayed at a position shifted from the front running car 10 or the like. For example, even if the position of the front running car 10 or the like at a future display timing is predicted in the rendering processing, because there is a delay from the timing at which the prediction was made until display is performed, the predicted position of the front running car 10 or the like may possibly be shifted from the position of the front running car 10 or the like when the HUD actually displays the virtual object 20.

Figure 2:
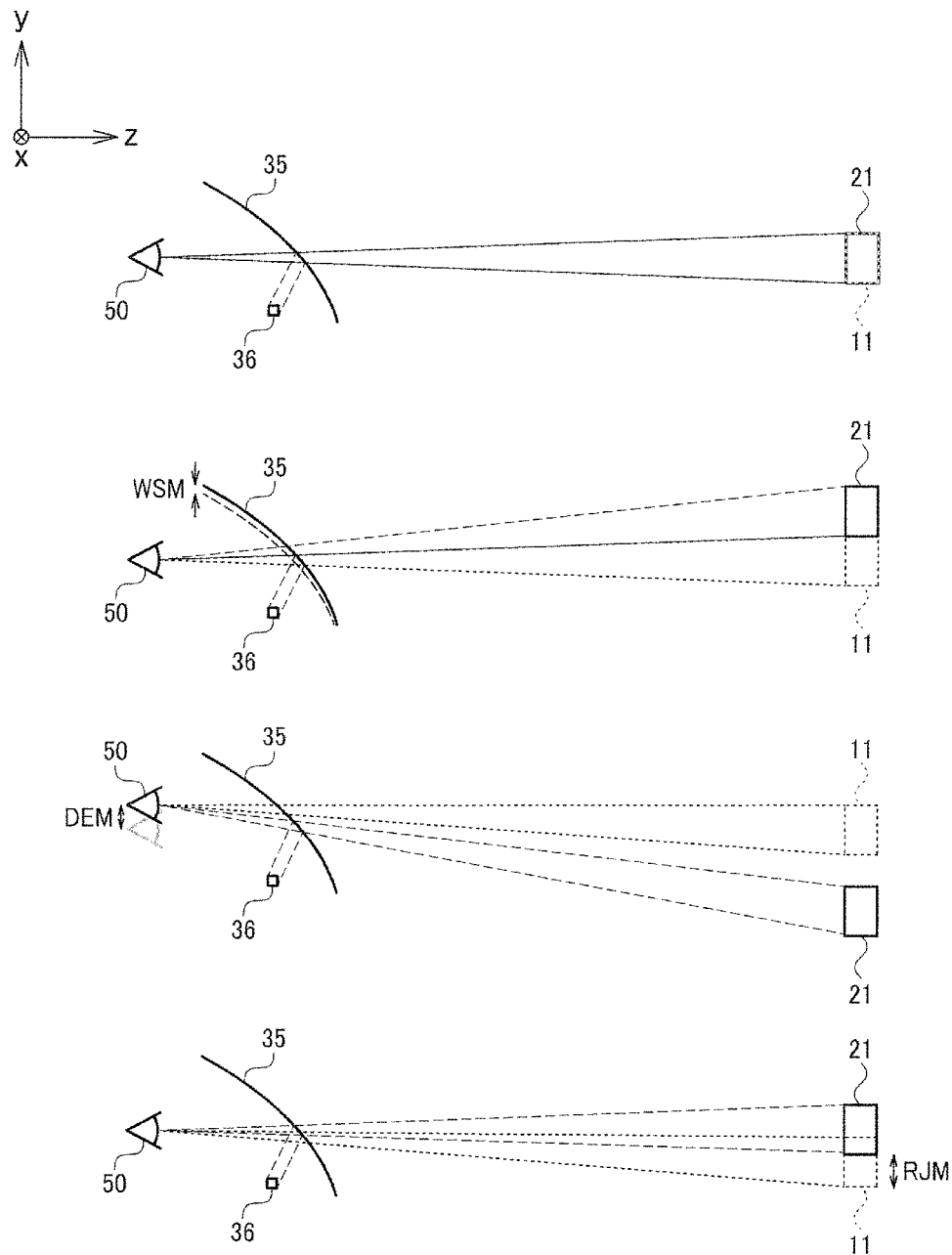
FIG. 2 is a diagram illustrating a shift in display position by a pitch displacement or a vertical displacement.

FIG. 2 is a diagram illustrating a shift in display position due to pitch displacement or vertical displacement, as an example. x, y, and z are of the coordinate system fixed to the automobile 30. A z direction is a running direction of the automobile, and an x direction and a y direction are orthogonal to the z direction, and orthogonal to each other. When the y direction matches the vertical direction, the x direction is a horizontal direction, and the y direction is a vertical direction or an up-down direction. When the automobile is oriented such that the y direction does not match the vertical direction, the x and y directions do not match the horizontal and vertical directions, but in the following description, the x direction is also called as the horizontal direction, and the y direction is also called as the vertical direction or the up-down direction, for the sake of convenience. The arrow directions shown in the diagram are positive directions, and when the positive/negative of the direction needs to be specified, descriptions such as +x direction and −x direction are used.

The first diagram from the above in FIG. 2 shows a state in which the position shift between a virtual object 21 and a real object 11 is not present. The real object 11 is an object that is present in the real space, and is a tracking target of the AR display. For example, the front running car 10 and the like in FIG. 1 are real objects. A projection unit 36 of the HUD projects a virtual image on a windshield 35, and the virtual image is seen as a virtual object 21 from an eye 50 of the driver.

The second diagram from the above in FIG. 2 shows a position shift between the virtual object 21 and the real object 11 when the windshield 35 and the projection unit 36 have shifted in the +y direction by WSM. The vertical shift WSM occurs due to a pitch rotation or a vertical shift of the automobile 30. The pitch rotation is a rotation about an axis that is parallel to the x direction, and the vertical shift is a parallel movement in the y direction. Although the state shown in the first diagram is envisioned when the display system of the HUD has rendered the virtual object 21, there is a time lag until the display is actually performed by the HUD, and therefore if the vertical shift WSM occurs in this period, the vertical shift WSM is not reflected on the rendering image. As a result, the display position of the virtual object 21 shifts in the +y direction by the vertical shift WSM of the windshield 35 and the like, and the virtual object 21 is seen as being shifted in the +y direction relative to the real object 11. For example, when the automobile 30 repeats a pitch motion due to an unevenness of the road, the virtual object 21 is seen as being shifted so as to be vertically swinging relative to the real object 11.

The third diagram from the above in FIG. 2 shows a position shift between the virtual object 21 and the real object 11 when the eye 50 of the driver has shifted in the +y direction by DEM. Because the eye 50 shifts in the +y direction relative to the windshield 35, although the windshield 35 does not move, the display position of the virtual object 21 shifts in the −y direction. Therefore, the virtual object 21 is seen as being shifted in the −y direction relative to the real object 11.

The fourth diagram from the above in FIG. 2 shows a position shift between the virtual object 21 and the real object 11 when the real object 11 has shifted in the −y direction by RJM. Because the real object 11 shifts in the −y direction, although the display position of the virtual object 21 does not shift since the windshield 35 and the eye 50 do not move, the virtual object 21 is seen as being shifted in the +y direction relative to the real object 11.

Figure 3:
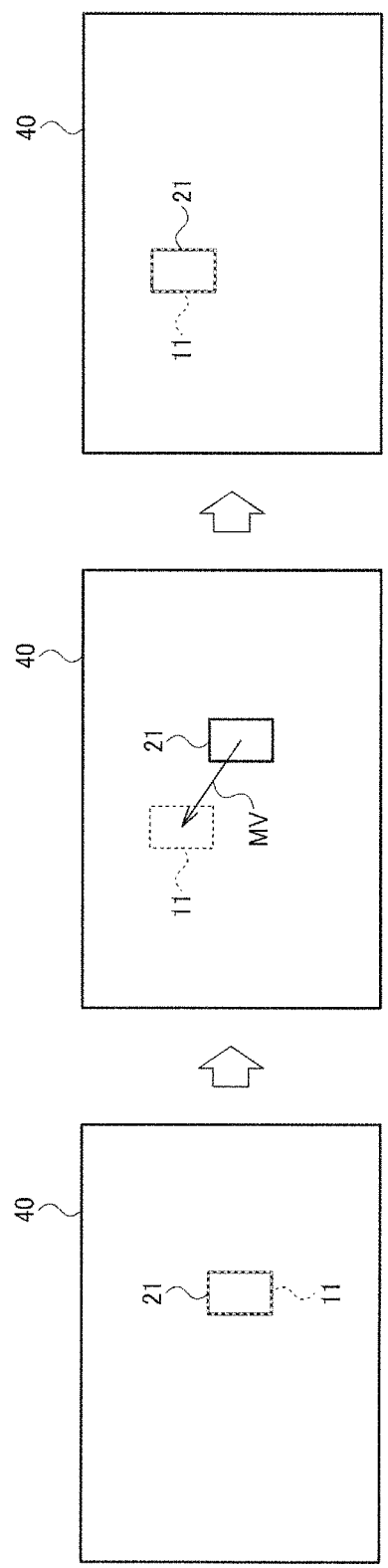
FIG. 3 is a diagram illustrating latency compensation of the present embodiment.

FIG. 3 is a diagram illustrating the latency compensation of the present embodiment. FIG. 3 shows the virtual object 21 viewed from the driver, the real object 11, and the virtual object 21. The diagram on the left of FIG. 3 shows a state in which the display positions, viewed from the driver, of the real object 11 and the virtual object 21 match. As shown in the diagram at the center of FIG. 3, when the driver has moved the head in an upper left direction, the real object 11 shifts in the upper left direction by MV. The display position of the virtual object 21 does not change, and therefore the real object 11 shifts from the virtual object 21 by MV. As shown in the diagram on the right of FIG. 3, in the present embodiment, the display positions of the real object 11 and the virtual object 21 are caused to match by compensating the shift amount MV due to latency. As a result of performing such latency compensation, when the driver moves the head in the upper left direction, the state shifts from the state shown on the left diagram to that shown on the right diagram, and therefore the state in which a position shift is present as shown in the central diagram can be avoided. Although the details will be described later, in the present embodiment, as a result of performing the latency compensation in the warp processing that is performed at a timing closest to the display timing, the position shift due to the latency is minimized as far as possible.

A typical display system and the latency that occurs in the display system, in a known technology, will be described in order to consider what type of latency is present in a display system of the HUD.

Figure 4:
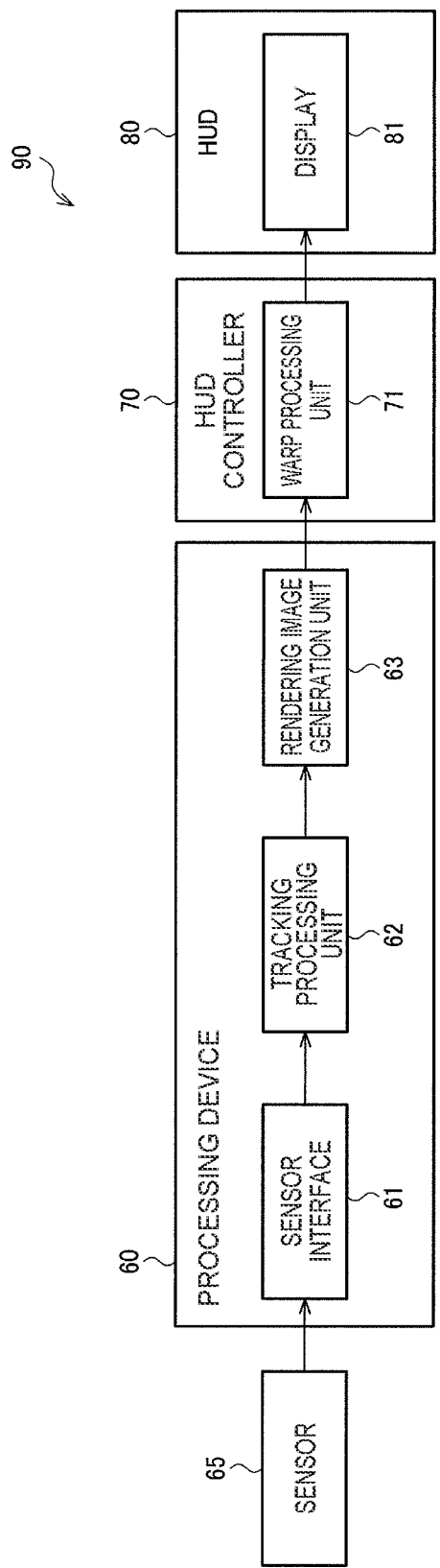
FIG. 4 shows an exemplary configuration of a display system in a known technology.

FIG. 4 shows an exemplary configuration of a display system 90 in a known technology. The display system 90 includes a sensor 65, a processing device 60, an HUD controller 70, and an HUD 80.

The sensor 65 is a sensor that detects the position, orientation, or motion of an automobile, a driver, or a real object.

The processing device 270 includes a sensor interface 61, a tracking processing unit 62, and a rendering image generation unit 63. The sensor interface 61 is an interface circuit that receives an output signal of the sensor 65. The tracking processing unit 62 is constituted by a CPU, and performs tracking of the position, orientation, or motion of the automobile, driver, or real object based on the output signal of the sensor 65. The rendering image generation unit 63 is constituted by a GPU, and renders the virtual object so as to follow the real object based on the tracking information of the automobile, driver, or real object.

The HUD controller 70 includes a warp processing unit 71 that performs warp processing on a rendering image. The HUD 80 includes a display 81 for displaying an image subjected to the warp processing. The display 81 is a display device such as a liquid crystal display device. As a result of the image displayed in the display 81 being projected on the windshield by the optical system, the virtual object of the rendering image is displayed.

Figure 5:
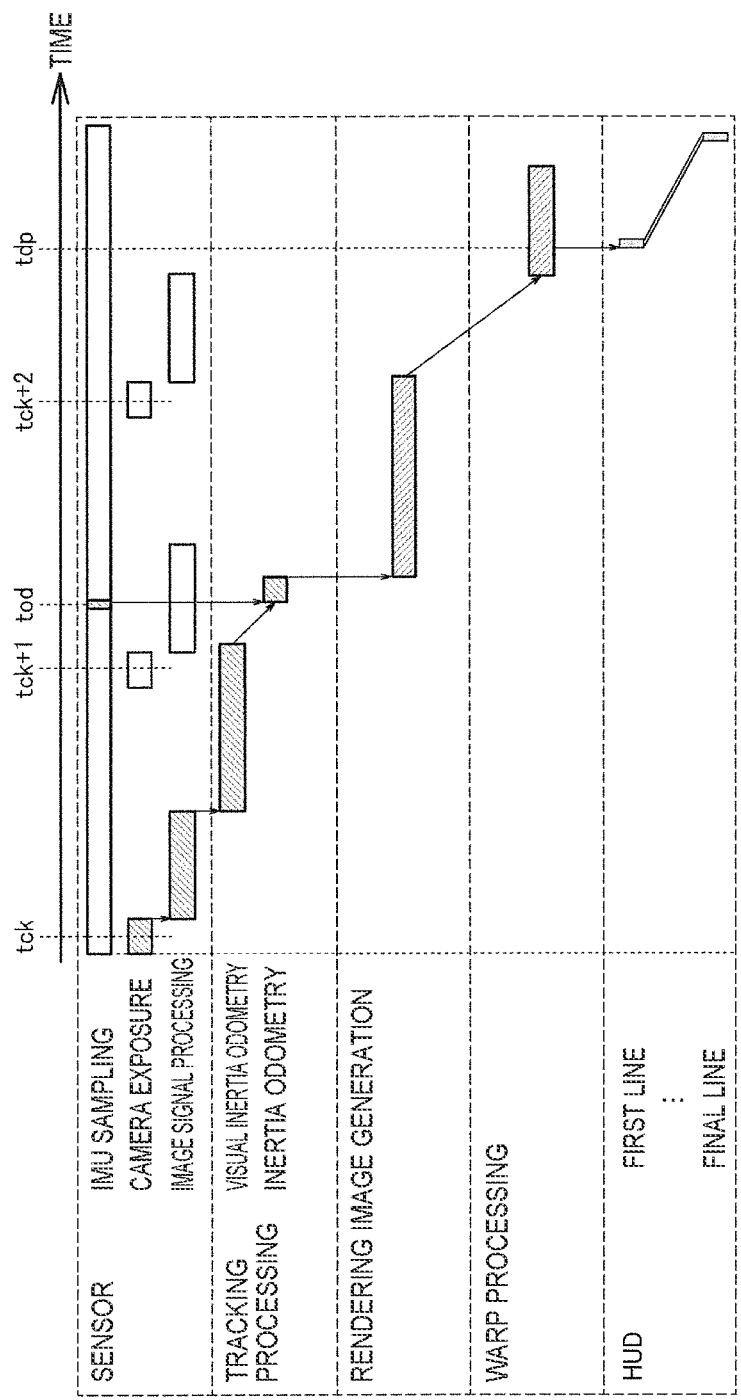
FIG. 5 shows a processing flow of the display system in the known technology.

FIG. 5 shows a processing flow of the display system 90. Here, an example in which an IMU and a camera are used as the sensor 65 is shown. The IMU performs sensing at a sampling rate that is sufficiently higher than the frame rate of the camera. tck, tck+1, and tck+2 indicate the exposure timings of the camera. That is, the image obtained by the camera shows the position of a real object at the timing tTck or the like. The image signal processing is processing performed after the exposure of the camera is ended, and includes signal reading out from the image sensor, developing processing, and the like.

The tracking processing unit 62 tracks the position of a real object from an image subjected to the image signal processing, by visual inertia odometry. In this stage, the position of the real object at the exposure timing tck of the camera is detected. The tracking processing unit 62 tracks the position of the real object by inertia odometry based on the output signal of the IMU at a timing tod after the visual inertia odometry is ended and the result of the visual inertia odometry. As a result of this processing, the latency from the exposure timing tck of the camera until the timing tod of the inertia odometry is compensated, and the position of the real object at the timing tod is detected.

The rendering image generation unit 63 renders a virtual object at a position corresponding to the real object that is detected by the inertia odometry, and outputs the rendering image to the warp processing unit 71. Here, a data communication time is incurred for data transmission from a GPU that constitutes the rendering image generation unit 63 to the HUD controller 70. The warp processing unit 71 performs warp processing on the rendering image, and an image subjected to the warp processing is displayed in the HUD 80. A first line to a final line are horizontal scan lines of the display 81, and scanning is performed line by line. Therefore, in order to display an image of one frame, a period of time is needed for scanning the first to final lines, but here the timing at which the first line is displayed is taken as a display timing tdp, as representative.

The virtual object to be displayed in the HUD 80 corresponds to the position of the real object at the timing tod. Therefore, latency is present from the timing tod until the display timing tdp, and as a result, it is possible that a shift occurs between the real object and the virtual object due to the motion of the automobile, driver, or real object in this period.

As described above, a rendered virtual object is displayed using tracking information that has been detected before the display timing tdp, and therefore, there is a problem in that the shift in display position occurs due to the latency from the timing at which the tracking information was detected until the display timing tdp.

In JP-A-2019-98756 described above, the measurement time of orientation data is reduced relative to the communication time of image data and the like, and a projection optical unit performs correction in a high frequency region using the orientation data, and with this, the position shift between the real image and the projection image due to the communication time is suppressed. However, data processing time for controlling the projection optical unit and operating times of constituting members are needed, and therefore the position shift caused by these times still remains.

Also, in JP-A-2019-179214 described above, a configuration in which the display shift correction is performed at a stage subsequent to the distortion correction is shown as a configuration in which the display shift correction is performed at a timing closest to display. In this configuration, the correspondence of distortion correction is changed by a predicted correction amount at a stage of distortion correction. The distortion correction is shifted in a direction opposite to the correction such that a correct distortion correction is reproduced after the position shift is corrected at a subsequent stage. Therefore, if the correction amount predicted in the distortion correction is different from the correction amount to be used in the display shift correction at a subsequent stage, the distortion image subjected to the display shift correction is not a correct distortion corrected image.

Figure 6:
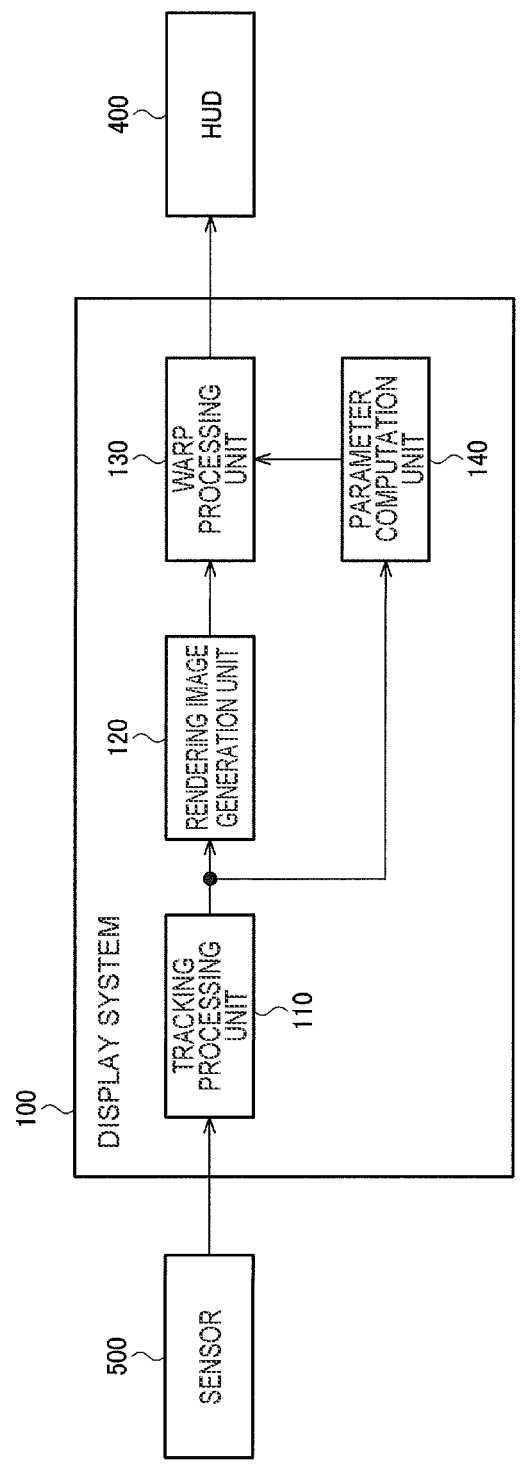
FIG. 6 shows an exemplary configuration of a display system in the present embodiment.

FIG. 6 shows an exemplary configuration of a display system 100 in the present embodiment. The display system 100 causes an HUD 400 to display a virtual object associated with a real object based on an output signal of a sensor 500. The display system 100 includes a tracking processing unit 110, a rendering image generation unit 120, a warp processing unit 130, and a parameter computation unit 140. Note that the configuration of the display system 100 is not limited to the configuration in FIG. 6, and the tracking processing unit 110 may be provided outside the display system 100, or the sensor 500 and the HUD 400 may be included in the display system 100, for example. An exemplary hardware configuration of the display system 100 will be described later.

The sensor 500 is a sensor for detecting the position, orientation, or motion of a mobile body, a viewer, or a real object. The sensor 500 is provided in the mobile body, and includes Lidar, IMU, a camera, an eye tracking sensor, or a head tracking sensor, for example. Lidar is an abbreviation of Light Detection and Ranging, and is a sensor for acquiring three-dimensional information such as a z map. IMU is an abbreviation of Inertial Measurement Unit, and is a sensor for detecting a one-axis or multi-axis motion. IMU is constituted by an acceleration sensor, or a gyro sensor, or a combination thereof, for example. The camera is a sensor for capturing an image, which is two-dimensional information. The eye tracking sensor is a sensor for detecting the position or the line of sight direction of the eye of a viewer, or both of the items. The head tracking sensor is a sensor for detecting the position or the orientation of the viewer's head, or both of the items.

The mobile body is an object in which the HUD 400 and the sensor 500 are mounted and that moves in a real space, while accommodating a viewer, and is an automobile, a two-wheeled vehicle, an airplane, or a ship. The viewer is a user who views a virtual image projected by the HUD 400, and is an operator or a passenger of the mobile body. The real object is an object that is present in the real space. The real object need only be an object whose position or orientation in the HUD display region, viewed from the viewer, changes when the position or orientation of the mobile body, viewer, or real object changes.

The tracking processing unit 110 tracks the position, orientation, or motion of the mobile body, viewer, or real object based on the output signal of the sensor 500, and outputs the result as tracking information. For example, the tracking processing unit 110 tracks a real object based on two-dimensional distance measurement information from Lidar, or a two-dimensional image from a camera. Also, the tracking processing unit 110 tracks an automobile based on information regarding acceleration or angular velocity from IMU. Also, the tracking processing unit 110 tracks the eye of a driver based on the information regarding the position or line of sight direction of the eye from an eye tracking sensor.

The tracking information may be any form of information as long as being information indicating the position, orientation, or motion of the mobile body, viewer, or real object. For example, the tracking information is coordinates indicating the position in the real space, an angle indicating the orientation, a vector indicating the parallel movement, an angular velocity indicating the rotation, or the like. Alternatively, the tracking information may also be information obtained by converting the coordinates or the like in the real space to the coordinates, angle, vector, angular velocity, or the like on the image. The tracking information includes first tracking information of the mobile body, second tracking information of the viewer, and third tracking information of the real object. Note that the tracking information need only include at least one of the first to third tracking information, and the second tracking information of the viewer may be omitted.

The rendering image generation unit 120 renders a virtual object based on the tracking information of the mobile body, viewer, or real object, and outputs a rendering image including the virtual object. Specifically, the rendering image generation unit 120 obtains the position, in the display region of the HUD 400, at which the real object appears, and renders the virtual object at a position corresponding to the position of the real object.

The parameter computation unit 140 obtains a latency compensation parameter based on the tracking information, corrects the warp parameter to be used in the warp processing based on the latency compensation parameter, and outputs a corrected warp parameter. The tracking information used here is obtained by performing sampling after the sampling timing of the tracking information used in the rendering processing. From a viewpoint of minimizing the latency, it is desirable to use tracking information acquired at a timing immediately before or closest to parameter computation.

The latency compensation parameter is a parameter for compensating the difference between the position of the virtual object in the rendering image and the position of the virtual object at the display timing. The latency compensation parameter indicates a shift amount or a rotation angle on image data. Specifically, the latency compensation parameter indicates a shift amount or a rotation angle in an undistorted image before being subjected to warp processing.

The warp parameter is a parameter for coordinate transformation in the warp processing, and is a parameter for associating a coordinate of an input image with a coordinate of an output image, in the warp processing. The warp parameter is a matrix or a table that shows the coordinate transformation between the input image and the output image, for example.

The warp processing unit 130 performs warp processing on a rendering image such that, when the rendering image is projected on the curved screen, an undistorted image can be viewed. Specifically, the warp processing unit 130 generates a display image by performing coordinate transformation on the rendering image using a corrected warp parameter output by the parameter computation unit 140. This coordinate transformation is coordinate transformation for canceling the image distortion due to the curve of the screen. The display image is an image to be displayed in the display panel of the HUD 400, the display image displayed in the display panel is projected on the screen by the projection unit, and as a result, the display image is displayed as an undistorted virtual image.

The HUD 400 includes a projection unit for projecting the virtual image on the screen. The projection unit includes a display panel that displays the display image, and an optical system that projects the display image displayed in the display panel on the screen as the virtual image. The screen is a windscreen or the like of the mobile body. Alternatively, the HUD 400 may include a dedicated screen, and the virtual image may be projected on the screen.

Figure 7:
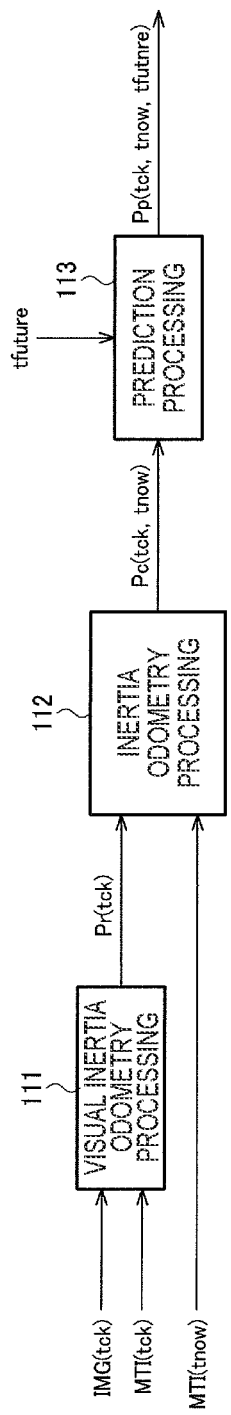
FIG. 7 shows a detailed processing flow of a tracking processing unit.
Figure 8:
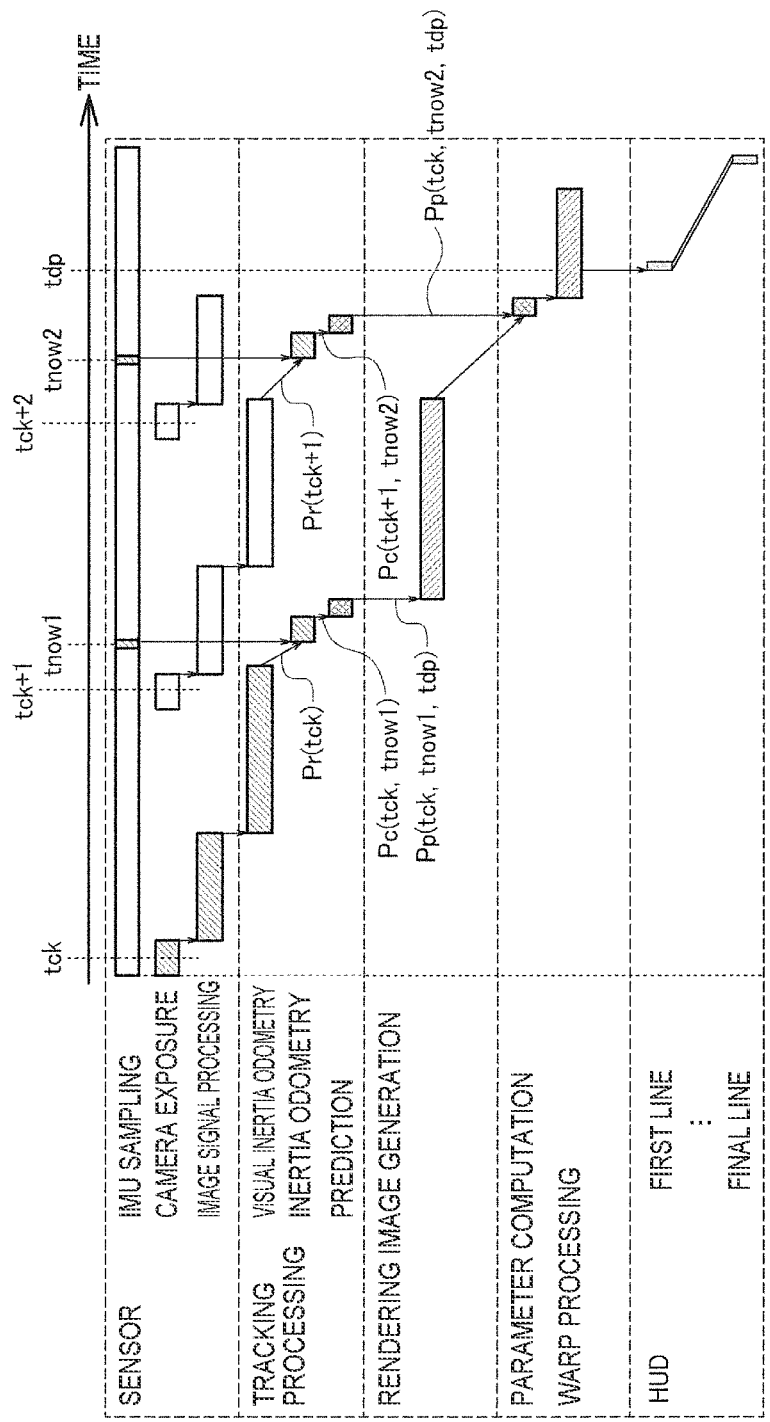
FIG. 8 shows a processing flow of the display system.

FIG. 7 shows a detailed processing flow of the tracking processing unit 110, and FIG. 8 shows a processing flow of the display system 100. Note that the tracking processing shown in FIG. 7 is merely an example, and the method of tracking a real object or the like is not limited thereto. Also, the sensor to be used in the tracking processing may be selected according to the adopted method.

The operations of the sensor shown in FIG. 8 are as described in FIG. 5. The tracking processing unit 110 performs visual inertia odometry processing 111 based on an image IMG(tck) captured by the camera at a timing tck and motion information MTI(tck) of the mobile body obtained by sampling performed by the IMU at the timing tck, and estimates the position and orientation Pr(tck) of the real object and the mobile body at the timing tck.

The tracking processing unit 110 performs inertia odometry processing 112 based on the position and orientation Pr(tck) and motion information MTI(tnow1) of the mobile body obtained by sampling by the IMU at a timing tnow1, and estimates the position and orientation Pc(tck, tnow1) of the real object and the mobile body at the timing tnow1. The timing tnow1 is a timing after the timing tck, and before the inertia odometry processing 112 is started. The timing tnow1 is desirably a timing after the visual inertia odometry processing 111 is ended and before the inertia odometry processing 112 is started.

The tracking processing unit 110 performs prediction processing 113 based on the position and orientation Pc(tck, tnow1), and predicts the position and orientation Pp(tck, tnow1, tfuture) of the real object and the mobile body at a timing tfuture that is a timing after the timing tnow1. In FIG. 8, an example is shown in which tfuture=tdp is assumed, and the position and orientation Pp(tck, tnow1, tdp) is predicted. The timing tdp is a display timing of the HUD. The prediction processing 113 predicts the position and orientation Pp in the future based on the derivative of the position and orientation Pc obtained as time series data.

The rendering image generation unit 120 renders the virtual object based on the position and orientation Pp(tck, tnow1, tdp), and outputs the rendering image. If this rendering image is caused to be displayed by the HUD 400 as is, the virtual object is displayed so as to be associated with the position of the real object indicated by the position and orientation Pp.

Here, the predicted position and orientation Pp(tck, tnow1, tdp) is predicted using information at timings tck and tnow1, and is not a position based on the actual sensor output at the timing tdp. That is, if the actual motion occurring in a period between the timings tnow1 and tdp is different from the motion predicted by the prediction processing 113, the position shift between the virtual object and the real object may occur due to latency. That is, in the example in FIG. 8, the latency to be compensated is the latency due to processing time between the timings tnow1 and tdp. Note that the latency to be compensated is not limited thereto. For example, when the rendering processing is performed using the position and orientation Pr(tck) while omitting the inertia odometry and the prediction processing, the latency due to the processing time between the timings tck and tdp is to be compensated.

In the present embodiment, the position shift due to the above-described latency is compensated as follows. The tracking processing unit 110 performs the visual inertia odometry processing 111 based on an image IMG(tck+1) captured by the camera at a timing tck+1 and motion information MTI(tck+1) of the mobile body obtained by sampling performed by the IMU at the timing tck+1, and estimates position and orientation Pr(tck+1) of the real object and the mobile body at the timing tck+1. The timing tck+1 is a camera exposure timing next to the timing tck.

The tracking processing unit 110 performs the inertia odometry processing 112 based on the position and orientation Pr(tck+1) and motion information MTI(tnow2) of the mobile body obtained by sampling performed by the IMU at a timing tnow2, and estimates a position and orientation Pc(tck+1, tnow2) of the real object and the mobile body at the timing tnow2.

The tracking processing unit 110 performs the prediction processing 113 based on the position and orientation Pp(tck+1, tnow2), and predicts the position and orientation Pp(tck+1, tnow2, tdp) of the real object and the mobile body at the timing tdp.

The parameter computation unit 140 obtains a latency compensation parameter based on the position and orientation Pp(tck, tnow1, tdp) and the position and orientation Pp(tck+1, tnow2, tdp). Specifically, the parameter computation unit 140 obtains a latency compensation parameter so as to cancel the position shift of the virtual object due to the difference between the position and orientation Pp(tck, tnow1, tdp) and the position and orientation Pp(tck+1, tnow2, tdp). The parameter computation unit 140 corrects the warp parameter using the latency compensation parameter, and outputs a corrected warp parameter.

The warp processing unit 130 performs the warp processing on the rendering image using the corrected warp parameter, and generates the display image. The warp processing unit 130 sequentially performs the warp processing regarding the first to final lines according to the scan timings of the first to final lines in the display panel of the HUD 400, and sequentially outputs data of each line obtained by the warp processing to the HUD 400 according to the scan timing. In FIG. 8, the display timing of the first line is assumed to be the timing tdp, but the timing tdp may be any timing in a frame period in which the first to final lines are displayed.

According to the present embodiment described above, the warp processing unit 130 performs, in the warp processing, latency compensation processing for compensating the position of the virtual object in the display region based on the latency compensation parameter.

In this way, the position shift of the virtual object incurred by the latency due to the rendering processing and the like performed in the period between the timings tnow1 and tdp is compensated based on the latency compensation parameter. As a result of performing the latency compensation in the warp processing that is performed immediately before display, the remaining latency can be minimized, and therefore the AR display in which the trackability of a virtual object with respect to a real object is high can be realized. Also, in the present embodiment, the latency compensation is performed by image data processing without using an optical compensation mechanism as disclosed in JP-A-2019-98756, and therefore the latency compensation can be realized without changing the configuration of the projection unit and the like. Also, in contrast to the configuration in which the display shift correction is performed after distortion correction as disclosed in JP-A-2019-179214, in the present embodiment, the latency compensation is integrally performed in the warp processing, and therefore accurate distortion correction and latency compensation can be realized.

Also, in the present embodiment, the rendering image generation unit 120 generates a rendering image based on tracking information at a first timing. The parameter computation unit 140 computes the latency compensation parameter based on tracking information at a second timing that is after the first timing and before the image display timing tdp, and the tracking information at the first timing. In the example in FIG. 8, the timing tnow1 corresponds to the first timing and the timing tnow2 corresponds to the second timing.

In this way, the latency between the first timing and the display timing is reduced to the latency between the second timing and the display timing, and therefore the position shift due to latency can be reduced. A description will be given using the example in FIG. 8. The motion information obtained by sampling performed by the IMU at the timing tnow2 that is after the timing tnow1 is reflected on the latency compensation parameter for correcting the warp parameter. As a result of correcting the display position of a virtual object using this latency compensation parameter, the latency between the timings tnow1 and tdp is reduced to the latency between the timings tnow2 and tdp. Because the warp processing is processing that is performed immediately before the HUD display, the timing tnow2 is a timing close to the timing tdp, the latency is reduced as far as possible, and the shift in display position of the virtual object due to latency can be minimized.

Also, in the present embodiment, the parameter computation unit 140 outputs the corrected warp parameter by correcting the warp parameter subjected to coordinate transformation according to the curve of the display region based on the latency compensation parameter. The warp processing unit 130 performs the latency compensation processing by performing the warp processing using the corrected warp parameter.

As a result of performing the warp processing using the corrected warp parameter based on the latency compensation parameter in this way, the latency compensation can be performed in the warp processing. For example, a configuration is conceivable in which the image processing for latency compensation is separately performed from the warp processing. However, the processing load increases in an amount corresponding to the image processing for latency compensation, and as a result of performing the warp processing after performing the latency compensation, the latency due to the warp processing remains. In the present embodiment, the latency compensation is integrated into the warp processing, and therefore the latency can be minimized while suppressing the increase in the processing load.

Also, in the present embodiment, the tracking information is information indicating displacements including at least one of a first axis displacement and a second axis displacement that are perpendicular to the running direction of the mobile body. The running direction corresponds to the z direction, the first axis corresponds to the axis in the x direction, and the second axis corresponds to the axis in the y direction. The parameter computation unit 140 outputs the corrected warp parameter obtained by correcting the error in the position of the virtual object incurred by the displacements.

In the latency compensation, the change in position or orientation that occurs in a short period of time is compensated, and swaying of the mobile body or the viewer is considered to largely influence the change in position or orientation that occurs in a short period of time. When the mobile body or the viewer sways, the real object viewed by the viewer through the display region is considered to be shift-displaced. According to the present embodiment, the error in position of the virtual object that is incurred by the first axis displacement and the second axis displacement that are perpendicular to the running direction of the mobile body is corrected, and as a result, the shift in display position due to the swaying of the mobile body or the viewer can be compensated.

Also, in the present embodiment, the displacement in the up-down direction of the mobile body is the second axis displacement, of the first axis displacement and the second axis displacement that are perpendicular to the running direction of the mobile body. Here, the tracking information includes information indicating the second axis displacement of the HUD 400 or the viewer due to a pitch displacement of the mobile body. The parameter computation unit 140 outputs the corrected warp parameter obtained by correcting the error in position of the virtual object incurred by the second axis displacement.

A pitch displacement is envisioned as the swaying of the mobile body described above, and the pitch displacement of the mobile body causes the second axis displacement of the HUD screen or the viewer. The second axis displacement of the HUD screen or the viewer causes a shift displacement of the real object viewed by the viewer through the display region in the second axis direction. According to the present embodiment, the error in the position of the virtual object that is incurred by the second axis displacement of the HUD screen or the viewer is corrected, and therefore the shift in display position due to the pitch displacement of the mobile body can be compensated.

Also, in the present embodiment, the warp processing unit 130 performs, in the warp processing, the latency compensation processing for compensating at least one of the rotation and scaling of the virtual object in the display region based on the latency compensation parameter.

In this way, the latency compensation regarding the rotation or scaling may be performed in addition to the latency compensation regarding the shift displacement. The scaling is an operation to reduce or zoom a virtual object. According to the present embodiment, the rotation error or the scaling error, or both of them, of a virtual object due to latency can be compensated, and therefore the AR display having high trackability can be realized.

Also, in the present embodiment, the tracking processing unit 110 generates tracking information based on an output signal of a motion sensor for detecting the motion of a mobile body. The parameter computation unit 140 computes the latency compensation parameter using the tracking information based on the output signal of the motion sensor. The motion sensor is an above-described IMU, for example, but there is no limitation thereto, and need only be a sensor for detecting the acceleration, speed, position, angular velocity, or orientation of a mobile body.

As described above, the influence of swaying of a mobile body is conceivable as a latency compensation target. According to the present embodiment, the latency compensation parameter is computed using the tracking information based on an output signal of the motion sensor for detecting the motion of a mobile body, and therefore the position shift of a virtual object due to swaying of the mobile body can be compensated.

2. First Detailed Exemplary Configuration

In the following, two examples of the hardware configuration of the display system 100 will be described, but the hardware configuration of the display system 100 is not limited thereto.

Figure 9:
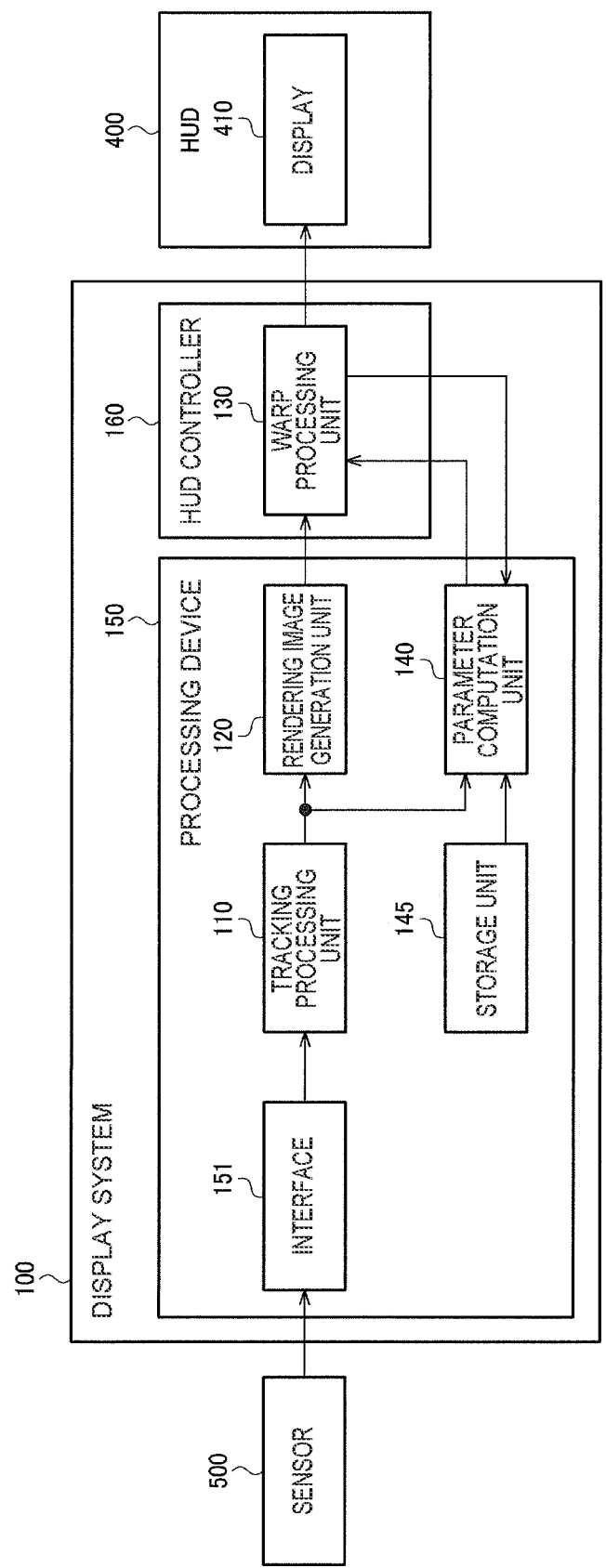
FIG. 9 shows a first detailed exemplary configuration of the display system.

FIG. 9 shows a first detailed exemplary configuration of the display system 100. The display system 100 includes a processing device 150 and an HUD controller 160. The processing device 150 is constituted by an SoC, for example, and includes an interface 151, the tracking processing unit 110, the rendering image generation unit 120, the parameter computation unit 140, and a storage unit 145. SoC is an abbreviation of System on Chip. The HUD controller 160 is constituted by an integrated circuit device, for example, and includes the warp processing unit 130. Note that the constituent elements that have already been described are given the same reference signs, and the description thereof will be omitted, as appropriate.

The interface 151 is an interface for inputting the output signal of the sensor 500 to the processing device 150. The interface 151 is a receiver circuit that receives an output signal of the sensor 500, for example. Alternatively, the interface 151 may also be a terminal to which the output signal of the sensor 500 is input. In this case, the output signal of the sensor 500 input to the terminal is input to a processor that constitutes the tracking processing unit 110, and the processor performs receiving processing on the output signal of the sensor 500.

The tracking processing unit 110 performs the tracking processing based on the output signal of the sensor 500. The rendering image generation unit 120 renders a virtual object based on the tracking information output by the tracking processing unit 110. The tracking processing unit 110 and the rendering image generation unit 120 are constituted by a processor such as a CPU or a GPU. CPU is an abbreviation of Central Processing Unit. GPU is an abbreviation of Graphical Processing Unit. The tracking processing unit 110 and the rendering image generation unit 120 may be realized by one processor or realized by separate processors.

The storage unit 145 is a semiconductor memory such as RAM or a nonvolatile memory, and stores the warp parameter before being subjected to the latency compensation. RAM is an abbreviation of Random Access Memory. As described above, the warp parameter is represented as a matrix or a table. The warp parameter may be any of a forward mapping parameter and an inverse mapping parameter. The forward mapping parameter is a parameter for associating each pixel of an input image with a movement destination coordinate corresponding to the pixel, or for associating each pixel of an input image with a relative movement amount to a movement destination coordinate corresponding to the pixel. The inverse mapping parameter is a parameter for associating each pixel of an output image with a referenced coordinate corresponding to the pixel, or for associating each pixel of an output image with a relative movement amount from a referenced coordinate corresponding to the pixel.

The parameter computation unit 140 obtains a latency compensation parameter based on the tracking information, corrects the warp parameter read out from the storage unit 145 based on the latency compensation parameter, and outputs a corrected warp parameter. The parameter computation unit 140 may be realized by the same processor as that of the tracking processing unit 110 and the rendering image generation unit 120, or may be realized by a processor different from that processor.

The warp processing unit 130 generates a display image by performing the warp processing on a rendering image using the corrected warp parameter. The warp processing unit 130 is constituted by a logic circuit, and is constituted by a gate array designed using automatic placement and routing, a standard cell array designed using automatic routing, or the like. The HUD 400 includes a display 410, and displays the display image in the display 410. The display 410 is a display device such as a liquid crystal display device. The HUD 400 includes a projection optical unit, which is not illustrated. The projection optical unit projects the image displayed in the display 410 on a screen, and with this, the virtual object is displayed so as to be overlaid on objects in the real space.

According to the present embodiment, the display system 100 includes the processing device 150 including the rendering image generation unit 120 and the parameter computation unit 140, and the HUD controller 160 including the warp processing unit 130.

In this way, the computation of the latency compensation parameter and the computation of the corrected warp parameter can be performed by the processing device 150, which is an SoC. With this, a circuit that performs the latency compensation need not be added to the HUD controller 160, and the latency compensation can be realized without increasing the circuit scale of the HUD controller 160.

Also, in the present embodiment, the processing device 150 includes the interface 151 to which the output signal of the sensor 500 is input, the sensor 500 being at least one of a first sensor that acquires two-dimensional information or three-dimensional information of a real object, a second sensor that detects the motion of a mobile body, and a third sensor that detects the viewpoint or the line of sight direction of a viewer. In the example of the sensor 500 described in FIG. 6, the Lidar or the camera corresponds to the first sensor, the IMU corresponds to the second sensor, and the eye tracking sensor corresponds to the third sensor. The parameter computation unit 140 computes the latency compensation parameter using the tracking information based on the output signal of the sensor 500.

The position shift of a virtual object due to latency is incurred by the change in position or orientation of the real object, mobile body, or viewer. According to the present embodiment, the sensor 500 can detect the change in position or orientation of at least one of the real object, mobile body, or viewer. Also, the parameter computation unit 140 computes the latency compensation parameter using the tracking information based on the output signal of the sensor 500, and as a result, the position shift of the virtual object incurred by the change in position or orientation of the real object, mobile body, or viewer can be compensated.

Also, in the present embodiment, the warp processing unit 130 outputs frame information indicating the target frame to be processed in the warp processing to the parameter computation unit 140. The parameter computation unit 140 computes the latency compensation parameter regarding the latency corresponding to the target frame based on the frame information.

As described in FIG. 8, the parameter computation unit 140 obtains the latency compensation parameter corresponding to the latency between the inertia odometry timing tnow1 and the display timing tdp. In the configuration in FIG. 9, the warp processing unit 130 is provided in the HUD controller 160, and the parameter computation unit 140 is provided in the processing device 150. Therefore, the parameter computation unit 140 cannot recognize the display timing tdp unless the information indicating the frame regarding which the warp processing unit 130 performs the warp processing is given. According to the present embodiment, the warp processing unit 130 outputs the frame information indicating the target frame to be processed in the warp processing to the parameter computation unit 140, and therefore the parameter computation unit 140 can recognize the display timing tdp.

3. Second Detailed Exemplary Configuration

Figure 10:
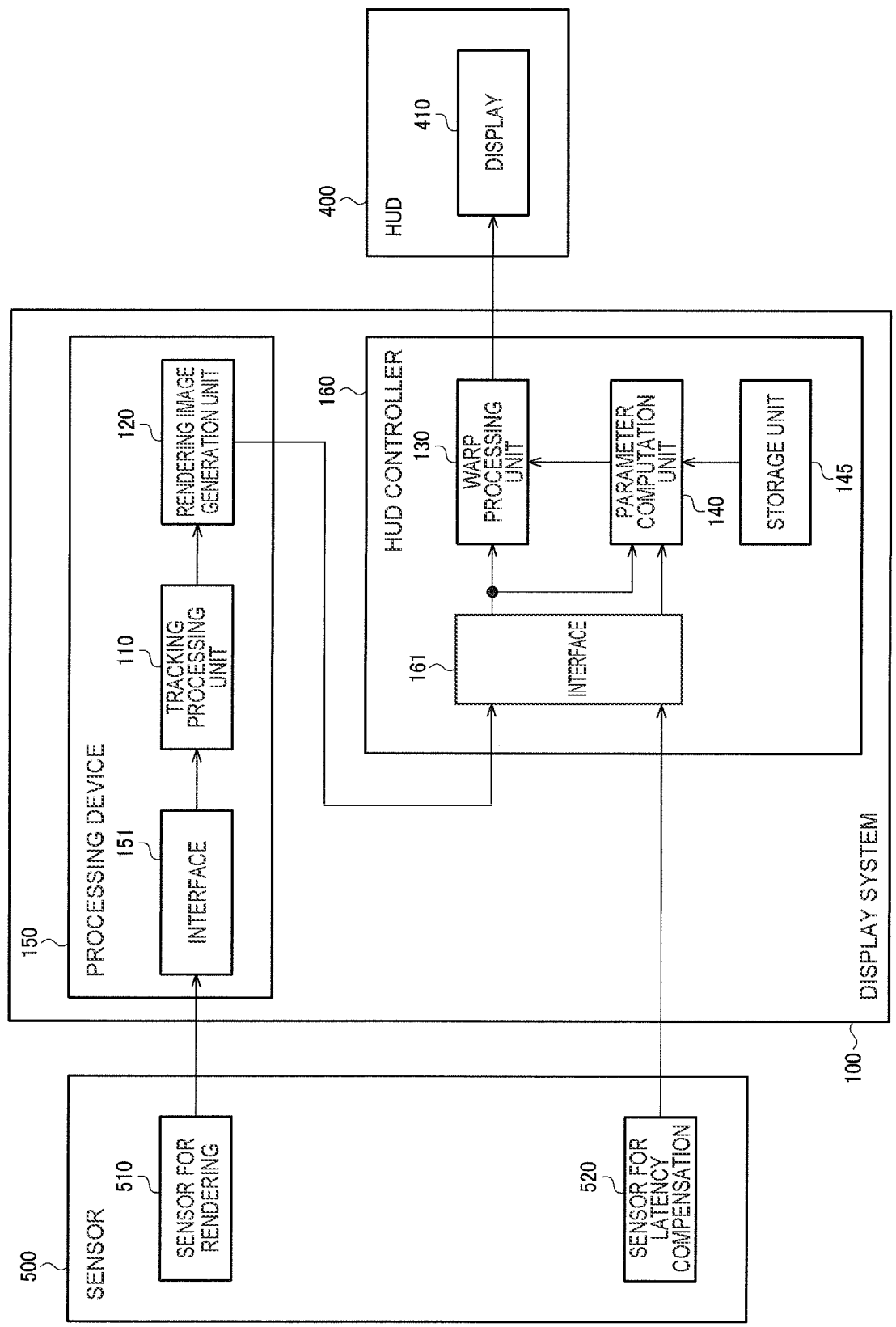
FIG. 10 shows a second detailed exemplary configuration of the display system.

FIG. 10 shows a second detailed exemplary configuration of the display system 100. In FIG. 10, the processing device 150 includes the interface 151, the tracking processing unit 110, and the rendering image generation unit 120. The HUD controller 160 includes an interface 161, the warp processing unit 130, the parameter computation unit 140, and the storage unit 145. Note that the constituent elements that have already been described are given the same reference signs, and the description thereof will be omitted, as appropriate.

The sensor 500 includes a sensor for rendering 510 for obtaining the tracking information for rendering and a sensor for latency compensation 520 for obtaining the latency compensation parameter. The sensor for rendering 510 includes Lidar, IMU, and a camera, for example. The sensor for latency compensation 520 includes IMU and a head tracking sensor, for example. Note that the types of the sensors included in the sensor for rendering 510 and the sensor for latency compensation 520 are not limited thereto, and the sensor need only be a sensor that can detect the position, orientation, or motion of the mobile body, viewer, or real object. The sensor for latency compensation 520 and the sensor for rendering 510 are separate sensors, and even in a case where sensors of the same type are included, the sensors of the same type are respectively provided in the sensor for latency compensation 520 and in the sensor for rendering 510.

The rendering image generation unit 120 outputs the tracking information acquired by the tracking processing unit 110 to the HUD controller 160 along with the rendering image.

The interface 161 is an interface for inputting the rendering image and tracking information that are transmitted from the processing device 150 and the output signal of the sensor for latency compensation 520 to the HUD controller 160. The interface 161 is a receiver circuit that receives a rendering image, tracking information, and an output signal of the sensor for latency compensation 520, for example. Alternatively, the interface 161 may be a receiver circuit that receives a rendering image and tracking information and a terminal to which the output signal of the sensor for latency compensation 520 is input. In this case, the output signal of the sensor for latency compensation 520 input to the terminal is input to the parameter computation unit 140, and the parameter computation unit 140 performs receiving processing on the output signal of the sensor for latency compensation 520.

The parameter computation unit 140 obtains the latency compensation parameter based on the tracking information transmitted from the processing device 150 along with the rendering image, and the output signal of the sensor for latency compensation 520. The parameter computation unit 140 corrects the warp parameter read out from the storage unit 145 based on the latency compensation parameter, and outputs the corrected warp parameter.

The warp processing unit 130 generates the display image by performing the warp processing on the rendering image using the corrected warp parameter. The warp processing unit 130 and the parameter computation unit 140 are constituted by logic circuits, and each are constituted by a gate array designed using automatic placement and routing, a standard cell array designed using automatic routing, or the like.

Figure 11:
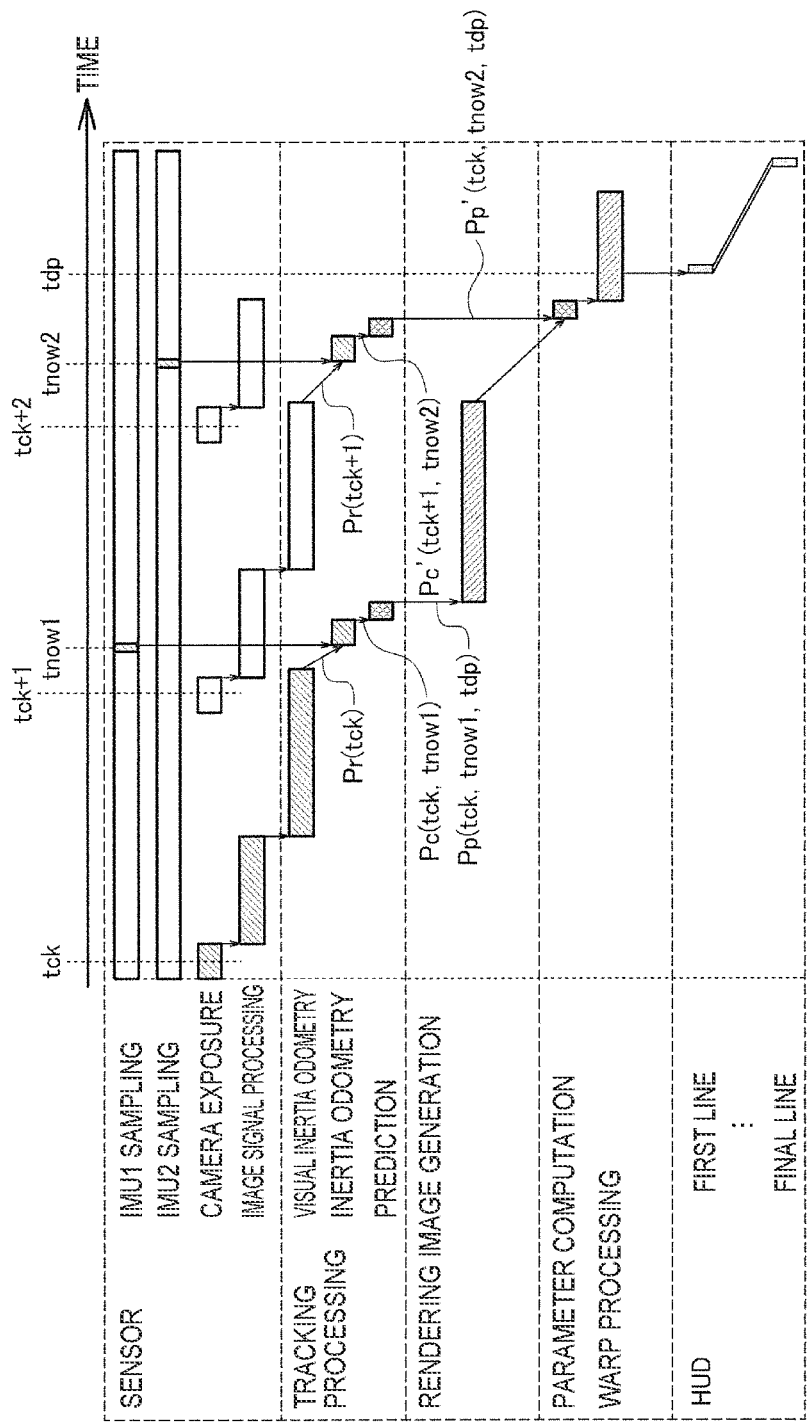
FIG. 11 shows a processing flow of the display system in the second detailed exemplary configuration.

FIG. 11 shows a processing flow of the display system 100 in the second detailed exemplary configuration. Note that the processing flow shown in FIG. 11 is merely an example, and the tracking method used for rendering or latency compensation is not limited to the method shown in FIG. 8. Also, the sensor used for tracking may be selected according to the adopted tracking method.

In FIG. 11, IMU1 and a camera are the sensor for rendering 510, and IMU2 is the sensor for latency compensation 520. The output signal of IMU2 sampled at a timing tnow2 is used for latency compensation.

Specifically, the tracking processing unit 110 estimates the position and orientation Pr(tck+1) by performing visual inertia odometry processing. The rendering image generation unit 120 outputs a position and orientation Pp(tck, tnow1, tdp) and the position and orientation Pr(tck+1) to the HUD controller 160 along with a rendering image that is rendered based on the position and orientation Pp(tck, tnow1, tdp).

The parameter computation unit 140 performs inertia odometry processing based on the position and orientation Pr(tck+1) input via the interface 161 and motion information MTI'(tnow2) of the mobile body that is obtained by sampling performed by IMU2 at the timing tnow2, and estimates the position and orientation Pc'(tck+1, tnow2) of the real object and the mobile body at the timing tnow2.

The parameter computation unit 140 performs prediction processing based on the position and orientation Pc'(tck+1, tnow2), and predicts the position and orientation Pp'(tck+1, tnow2, tdp) of the real object and the mobile body at the timing tdp.

The parameter computation unit 140 obtains the latency compensation parameter based on the position and orientation Pp(tck, tnow1, tdp) and the position and orientation Pp'(tck+1, tnow2, tdp). Specifically, the parameter computation unit 140 obtains a latency compensation parameter for canceling the position shift of the virtual object caused by the difference between the position and orientation Pp(tck, tnow1, tdp) and the position and orientation Pp'(tck+1, tnow2, tdp). The parameter computation unit 140 corrects the warp parameter using the latency compensation parameter and outputs the corrected warp parameter.

The warp processing unit 130 performs warp processing on the rendering image using the corrected warp parameter, and generates a display image.

According to the present embodiment, the display system 100 includes the processing device 150 including the rendering image generation unit 120, and the HUD controller 160 including the parameter computation unit 140 and the warp processing unit 130.

In this way, the HUD controller 160 is caused to compute the latency compensation parameter and the corrected warp parameter. Because the communication time for transmitting the corrected warp parameter to the HUD controller 160 is not needed, compared with the case where the processing device 150 is caused to compute the latency compensation parameter and the corrected warp parameter, the latency compensation can be performed using the sensor output at a timing closer to the display timing tdp.

Also, in the present embodiment, the processing device 150 includes a first interface to which the output signal of the sensor for rendering 510 is input. In FIG. 10, the interface 151 corresponds to the first interface. The rendering image generation unit 120 generates the rendering image based on the tracking information that is based on the output signal of the sensor for rendering 510. The HUD controller 160 includes a second interface to which the output signal of the sensor for latency compensation 520 that is different from the sensor for rendering 510 and the rendering image are input. In FIG. 10, the interface 161 corresponds to the second interface. The parameter computation unit 140 computes the latency compensation parameter based on the output signal of the sensor for latency compensation 520.

Accordingly, the parameter computation unit 140 can acquire the output signal of the sensor for latency compensation 520 at any timing, and therefore can acquire the output signal of the sensor for latency compensation 520 at a timing closest to the display timing tdp, and compute the latency compensation parameter.

Also, in the present embodiment, the rendering image generation unit 120 generates the rendering image based on the tracking information at a first timing, and outputs the tracking information at the first timing to the HUD controller 160 along with the rendering image. In FIG. 11, the first timing corresponds to the timing tnow1, and the tracking information at the first timing corresponds to the position and orientation Pp(tck, tnow1, tdp). The parameter computation unit 140 computes the latency compensation parameter based on the tracking information at a second timing that corresponds to the image display timing tdp and is after the first timing, and the tracking information at the first timing. In FIG. 11, the second timing corresponds to the timing tnow2, and the tracking information at the second timing corresponds to the position and orientation Pp'(tck+1, tnow2, tdp).

In this way, the latency between the first timing and the display timing is reduced to the latency between the second timing and the display timing, and therefore the position shift due to the latency is reduced. A description will be given using the example in FIG. 11. The motion information obtained by sampling performed by IMU2 at the timing tnow2 after the timing tnow1 is reflected on the latency compensation parameter for correcting the warp parameter. As a result of correcting the display position of the virtual object using this latency compensation parameter, the latency between the timings tnow1 and tdp is reduced to the latency between the timings tnow2 and tdp.

4. Warp Processing

In the following, the details of the warp processing will be described taking the inverse warp as an example. Note that the warp processing may be any of the forward warp and the inverse warp, and the warp processing unit 130 may be any of the forward warp engine and the inverse warp engine. The forward warp is transformation for moving each pixel of the input image that is input to the warp engine to any position in the output image. The forward warp engine is a warp engine having a function of the forward warp. The inverse warp is transformation for obtaining each pixel of the output image of the warp engine from a pixel at any position in the input image. The inverse warp engine is a warp engine having a function of the inverse warp.

Figures 12, 13:
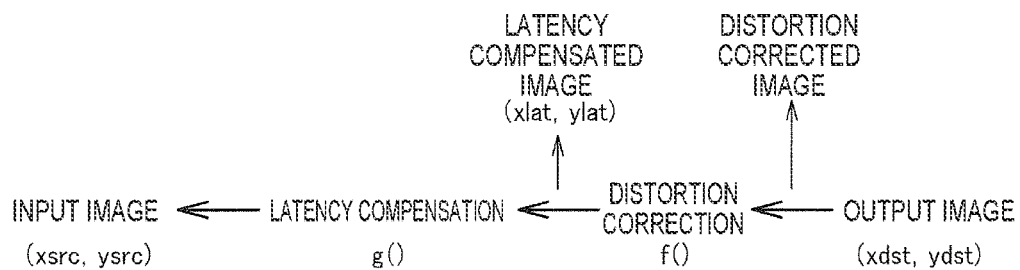
FIG. 12 is a diagram illustrating warp processing in the present embodiment.
FIG. 13 is a diagram illustrating a correspondence between tracking information of a mobile body or the like and latency compensation based on the tracking information.

FIG. 12 is a diagram illustrating the warp processing in the present embodiment. The input image is a rendering image. The output image is a display image to be displayed in a liquid crystal display panel of the HUD or the like. (xsrc, ysrc) indicates the position in the horizontal direction and the position in the vertical direction, in the input image. (xdst, ydst) indicates the position in the horizontal direction and the position in the vertical direction, in the output image.

When the correction of the warp parameter using the latency compensation parameter is expressed by $g(\ )$ the position in the latency compensation image is expressed as the following Formula (1).

$$(xlat, ylat) = g(xsrc, ysrc) \tag{1}$$

When the distortion correction using the warp parameter according to the curve of the screen is expressed as $f(\ )$ the position in the output image is expressed as the following Formula (2).

$$(xdst, ydst) = f(xlat, ylat) \tag{2}$$

From the Formulas (1) and (2), the coordinate transformation between the input image and the output image is expressed as the following Formula (3).

$$(xdst, ydst) = f \cdot g(xsrc, ysrc) \tag{3}$$

The inverse warp uses the inverse transformation of Formula (3), and is expressed as the following Formula (4).

$$(xsrc, ysrc) = g^{-1} \cdot f^{-1}(xdst, ydst) \tag{4}$$

In the present embodiment, the parameter computation unit 140 corrects the warp parameter $f^{-1}$ by obtaining the latency compensation parameter $g^{-1}$ and computing $g^{-1} \cdot f^{-1}$, and outputs the corrected warp parameter $g^{-1} \cdot f^{-1}$. The warp processing unit 130 generates the output image by performing the warp processing of Formula (4) using the corrected warp parameter $g^{-1} \cdot f^{-1}$.

FIG. 13 is a diagram illustrating the correspondence between the tracking information of a mobile body or the like and the latency compensation based on the tracking information. Here, six-axis motion information is assumed to be obtained as the tracking information.

A yaw displacement $\Delta\alpha$ is a rotational displacement in which an axis parallel to the y direction, which is a vertical direction, is the rotation axis. The yaw displacement $\Delta\alpha$ causes a horizontal shift of the real object that is viewed by the viewer through the screen. The horizontal shift is a shift in the x direction, which is a horizontal direction. Therefore the method of latency compensation is to perform a horizontal shift operation.

A pitch displacement $\Delta\beta$ is a rotational displacement in which an axis parallel to the x direction, which is a horizontal direction, is the rotation axis. The pitch displacement $\Delta\beta$ causes a vertical shift of the real object that is viewed by the viewer through the screen. The vertical shift is a shift in the y direction, which is a vertical direction. Therefore the method of latency compensation is to perform a vertical shift operation.

A roll displacement $\Delta\gamma$ is a rotational displacement in which an axis parallel to the z direction, which is a front-back direction of the mobile body, is the rotation axis. The roll displacement $\Delta\gamma$ causes a rotation of the real object that is viewed by the viewer through the screen. Therefore the method of latency compensation is to perform a rotation operation.

A horizontal shift $\Delta x$ is a shift in the x direction, and causes a horizontal shift of the real object that is viewed by the viewer through the screen. Therefore the method of latency compensation is to perform a horizontal shift operation.

A vertical shift $\Delta y$ is a shift in the y direction, and causes a vertical shift of the real object that is viewed by the viewer through the screen. Therefore the method of latency compensation is to perform a vertical shift operation.

A front-back shift Δz is a shift in the z direction, and causes a reduction or an enlargement of the real object that is viewed by the viewer through the screen. Therefore the method of latency compensation is to perform a reduction or a zooming operation.

FIG. 14 shows an example of the latency compensation parameters for realizing the compensation method described above. The matrix on the right side of the formula shown in FIG. 14 corresponds to $g^{-1}$ described in FIG. 12. m13 indicates the horizontal shift, and m23 indicates the vertical shift. m12 indicates the horizontal skew. Although the horizontal skew is a transformation such that a rectangle is distorted to a parallelogram, here, the horizontal skew is used to approximate the rotation. m11 indicates a horizontal scale, and m22 indicates a vertical scale. m11 and m22 correspond to reduction or zooming.

If a case where only the vertical shift has occurred is considered, for example, m11=m22=1, and m1 2=m13=0. Here, the formula in FIG. 14 is expressed as the following Formula (5).

$$(xsrc, ysrc)=(xlat, ylat+m23) \quad (5)$$

In FIG. 12, the inverse transformation $f^{-1}()$ of the distortion correction causes (xdst, ydst) to move to (xlat, ylat). The operation of Formula (5) is equivalent to cause this movement amount to shift in the vertical direction by m23, and the latency compensation is realized by this shift.

Figure 15:
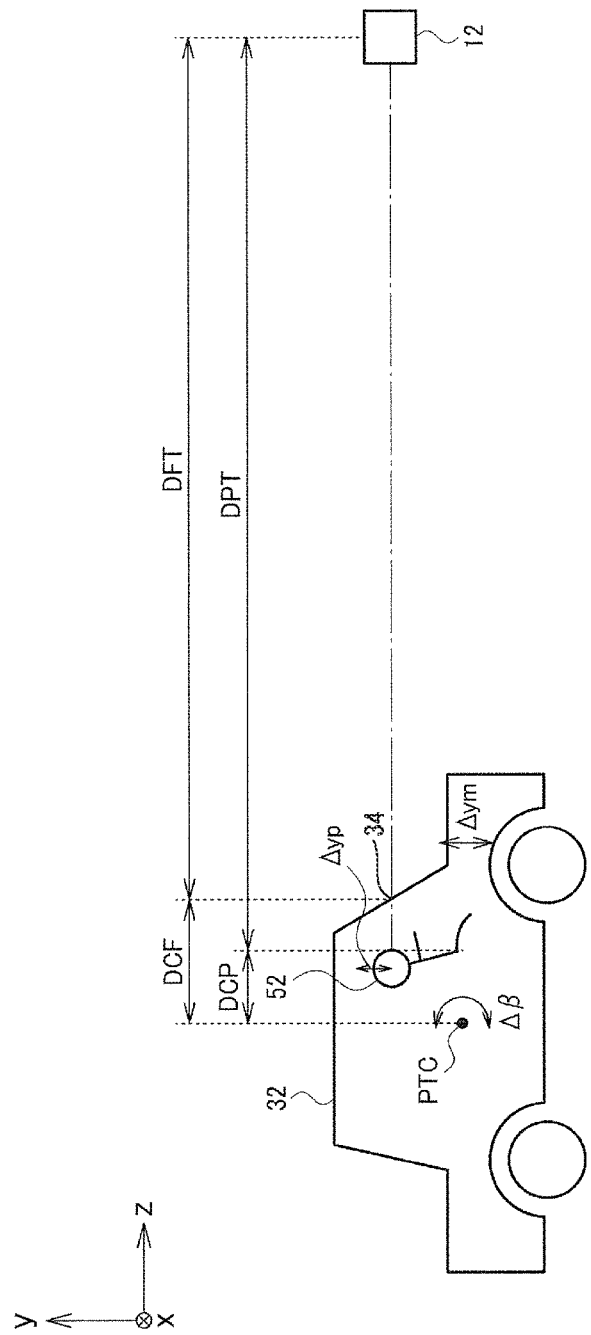
FIG. 15 is a diagram illustrating the method of computing the latency compensation parameter from the tracking information.

FIG. 15 is a diagram illustrating the method of computing the latency compensation parameter from the tracking information.

From the geometrical positional relationship between the rotation centers of the yaw, roll, and pitch, the viewer's head, the HUD screen, and the real object, the displacement occurring in the mobile body, the viewer, or the real object can be converted to a shift amount or a rotation angle on the screen. Also, the matrix on the right side in FIG. 14 can be determined from the shift amount or the rotation angle.

In FIG. 15, a method of obtaining the latency compensation parameter from the tracking information is described taking m23 indicating the vertical shift in FIG. 14 as an example. Here, an example will be described in which the pitch displacement Δβ and the vertical shift Δym of the mobile body 32, and the vertical shift Δyp of the viewer 52 are used as the tracking information.

When the distance between the pitch rotation center PTC and the screen 34 is denoted as DCF, the pitch displacement Δβ of the mobile body 32 causes the screen 34 to vertically shift by DCF×Δβ. Also, the vertical shift Δym of the mobile body 32 causes the screen 34 to vertically shift by Δym. When these shifts are added up, the vertical shift amount of the screen 34 is DCF×Δβ+Δym. If it is assumed that the head of the viewer 52 and the real object 12 do not move, when the screen 34 moves up by +(DCF×Δβ+Δym), for example, the position of the real object 12 on the screen 34 viewed from the viewer relatively moves by −(DCF×Δβ+Δym) vertically relative to the screen 34. Therefore, the latency compensation parameter in this case is m23=−(DCF×Δβ+Δym).

The distance between the head of the viewer 52 and the real object 12 is denoted as DPT, and the distance between the screen 34 and the real object 12 is denoted as DFT. If it is assumed that the screen 34 and the real object 12 do not move, when the viewer moves up by +Δyp, for example, the position of the real object 12 on the screen 34 viewed from the viewer 52 relatively moves up by +(DFT/DPT)×Δyp relative to the screen 34. If it is assumed that the distance to the real object 12 is sufficiently large, DFT/DPT can be approximated to 1, and therefore the vertical shift amount of the real object 12 is Δyp. Therefore, in this case, the latency compensation parameter is m23=Δyp.

According to the present embodiment, the display system 100 includes the storage unit 145, and the storage unit 145 stores the table in which the coordinate in the display image is associated with the movement amount indicating the movement destination of the coordinates, as the warp parameter. The parameter computation unit 140 shifts the movement amounts in the table based on the latency compensation parameter, and outputs the table in which the movement amounts are shifted as a compensated warp parameter.

In the example in FIG. 12, $f^{-1}()$ is stored in the storage unit 145 as a table. In the example described in FIG. 14 and Formula (5), the movement amount, in the table, of moving (xdst, ydst) to (xlat, ylat) is shifted in the vertical direction by m23, for example. That is, the table is corrected to a table for moving (xdst, ydst) to (xlat, ylat+m23).

Alternatively, the storage unit 145 may store the parameters of the transformation formula for transforming a coordinate in the display image to the movement destination coordinate, as the warp parameter. The parameter computation unit 140 shifts the movement destination coordinate based on the latency compensation parameter, and outputs, as the compensated warp parameter, the parameters of the transformation formula for obtaining the shifted movement destination coordinate.

The transformation formula is a polynomial, and the coefficients of the polynomial are stored in the storage unit 145 as the parameters of the transformation formula. In the example in FIG. 12, the parameters of the transformation formula representing $f^{-1}()$ are stored in the storage unit 145. In the example described in FIG. 14 and Formula (5), the movement amount obtained from the transformation formula for moving (xdst, ydst) to (xlat, ylat) is shifted in the vertical direction by m23, for example. That is, the formula is corrected to a transformation formula for moving (xdst, ydst) to (xlat, ylat+m23).

5. Electronic Apparatus and Mobile Body

Figure 16:
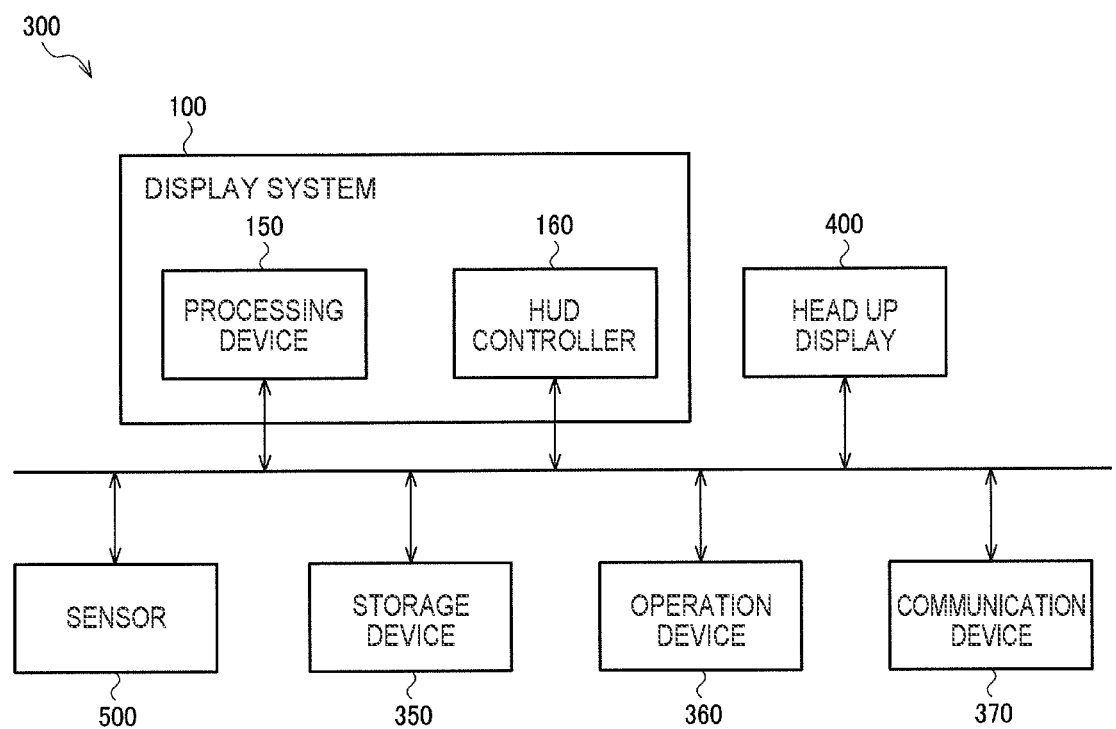
FIG. 16 shows an exemplary configuration of an electronic apparatus.

FIG. 16 shows an exemplary configuration of an electronic apparatus 300 including the display system 100 of the present embodiment. The electronic apparatus 300 includes the display system 100, a storage device 350, an operation device 360, a communication device 370, a head up display 400, and the sensor 500. The display system 100 includes the processing device 150 and the HUD controller 160.

The processing device 150 outputs a rendering image obtained by rendering a virtual object to the HUD controller 160. Also, the processing device 150 may output image data stored in the storage device 350, or a rendering image obtained by combining image data received by the communication device 370 and a virtual object, to the HUD controller 160. The HUD controller 160 performs latency compensation along with the warp processing on the rendering image. Also, the HUD controller 160 performs display timing control and the like. The head up display 400 drives a display panel based on the image data transferred from the HUD controller 160 and the display timing control made by the HUD controller 160, and displays an image in the display panel. The display panel is a liquid crystal display panel or an EL display panel, for example. The head up display 400 projects the image displayed in the display panel on a screen using a projection optical unit. The storage device 350 is a memory, a hard disk drive, or an optical disk drive, for example. The operation device 360 is a device for the user to operate the electronic apparatus 300, and is a button, a touch panel, or a keyboard, for example. The communication device 370 is a device for performing wired communication, or a device for performing wireless communication, for example. The wired communication is a LAN or a USB, for example. The wireless communication is a wireless LAN or near-field wireless communication, for example.

Various apparatuses such as an on-board electronic apparatus, a display terminal for plant facilities or the like, a display device mounted in a robot, and information processing device can be envisioned as the electronic apparatus including the circuit device of the present embodiment. The on-board electronic apparatus is a meter panel or the like. The information processing device is a PC or the like.

Figure 17:
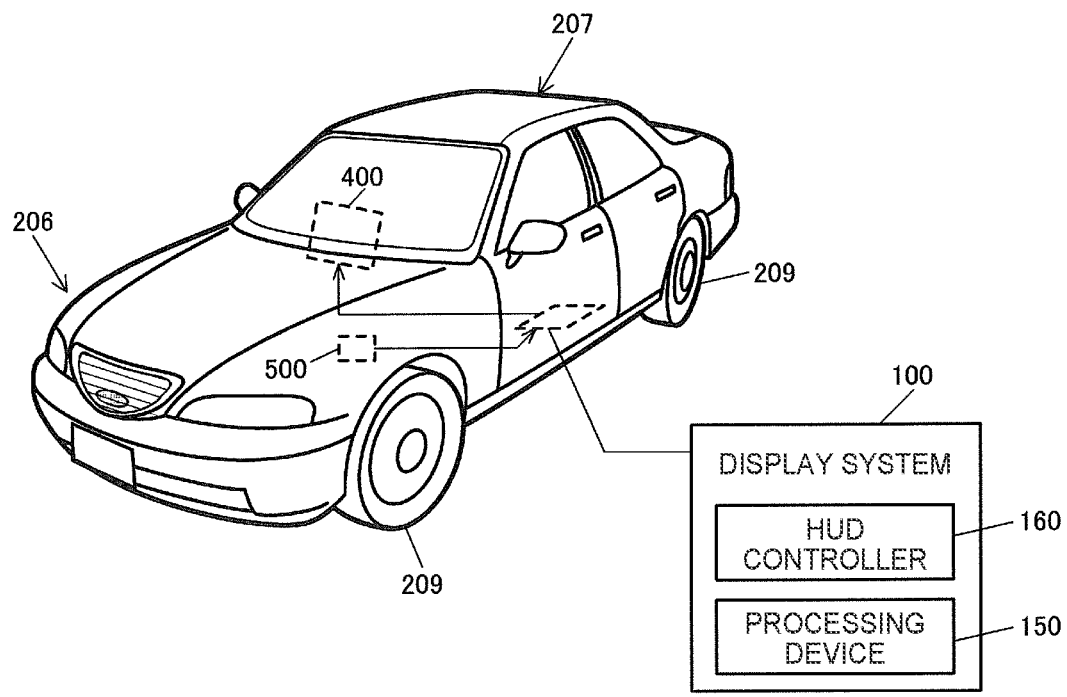
FIG. 17 shows an example of a mobile body.

FIG. 17 shows an example of a mobile body including the display system 100 of the present embodiment. The mobile body includes the display system 100, the head up display 400, and the sensor 500. The display system 100 includes the processing device 150 and the HUD controller 160. The display system 100 is provided in an ECU (Electronic Control Unit), for example, and the processing device 150 and the HUD controller 160 are incorporated in the ECU. Note that the HUD controller 160 may be incorporated in the head up display 400. The display system 100 of the present embodiment can be incorporated in various mobile bodies such as a car, an airplane, a motorcycle, a bicycle, and a ship, for example. The mobile body is an apparatus or a device that includes a drive mechanism such as an engine or a motor, steering mechanisms such as a steering wheel or a rudder, and various electronic apparatuses, for example, and moves on the ground, in the air, and on the sea. FIG. 17 schematically illustrates an automobile 206 serving as a specific example of the mobile body. The automobile 206 includes a car body 207 and wheels 209. The above-described ECU controls the traveling of the automobile 206 by controlling the engine, the brake, and the steering based on the operation made by the driver. The head up display 400 includes a transparent screen, and the transparent screen is installed between the driver's seat and the windshield. Alternatively, the head up display may use the windshield as a transparent screen, and project an image on the windshield. The head up display 400 may also function as a meter panel of the automobile 206 along with performing the AR display, for example.

The display system of the present embodiment described above is a display system of a head up display that displays, in a display region, a virtual object corresponding to a real object in the real space. The display system includes a rendering image generation unit, a parameter computation unit, and a warp processing unit. The rendering image generation unit generates a rendering image including the virtual object. The parameter computation unit computes a latency compensation parameter for compensating a latency including a rendering processing latency of the rendering image based on tracking information that is at least one of first tracking information of a mobile body in which the head up display is mounted, second tracking information of a viewer of the head up display, and third tracking information of the real object. The warp processing unit generates a display image to be displayed in the display region by performing warp processing in which coordinate transformation is performed on the rendering image according to a curve of the display region. The warp processing unit performs, in the warp processing, latency compensation processing for compensating the position of the virtual object in the display region based on the latency compensation parameter.

In this way, the position shift of a virtual object incurred by the latency including the rendering processing latency is compensated based on the latency compensation parameter. As a result of performing the latency compensation in the warp processing that is performed immediately before performing display, the remaining latency can be minimized, and therefore an AR display in which the trackability of a virtual object with respect to a real object is high can be realized.

Also, in the present embodiment, the rendering image generation unit may generate the rendering image based on the tracking information at a first timing. The parameter computation unit may compute the latency compensation parameter based on the tracking information at a second timing that is after the first timing and before a display timing of the display image and the tracking information at the first timing.

In this way, the latency between the first timing and the display timing is reduced to the latency between the second timing that is after the first timing and the display timing, and therefore the position shift due to the latency can be reduced.

Also, in the present embodiment, the parameter computation unit may output a corrected warp parameter obtained by correcting a warp parameter of the coordinate transformation according to the curve of the display region, based on the latency compensation parameter. The warp processing unit may perform the latency compensation processing by performing the warp processing using the corrected warp parameter.

In this way, as a result of performing the warp processing using a corrected warp parameter based on the latency compensation parameter, the latency compensation can be performed in the warp processing.

Also, in the present embodiment, the tracking information may be information indicating a displacement including at least one of a first axis displacement and a second axis displacement that are perpendicular to a running direction of the mobile body. The parameter computation unit may output the corrected warp parameter obtained by correcting a position error of the virtual object incurred by the displacement.

In the latency compensation, the change in position or orientation that occurs in a short period of time is compensated. The change in position or orientation that occurs in a short period of time is considered to be largely influenced by swaying of the mobile body or the viewer. When the mobile body or the viewer sways, the real object viewed by the viewer through the display region is considered to be shift-displaced. According to the present embodiment, the position error of the virtual object incurred by the first axis displacement and the second axis displacement that are perpendicular to the running direction of the mobile body is corrected, and therefore the shift in display position due to swaying of the mobile body or the viewer can be compensated.

Also, in the present embodiment, out of a first axis displacement and a second axis displacement that are perpendicular to a running direction of the mobile body, the displacement in an up-down direction of the mobile body may be the second axis displacement. Here, the tracking information may be information indicating the second axis displacement of the head up display or the viewer due to a pitch displacement of the mobile body. The parameter computation unit may output the corrected warp parameter obtained by correcting a position error of the virtual object incurred by the second axis displacement.

The pitch displacement is envisioned as the swaying of the mobile body described above, and the pitch displacement of the mobile body causes a second axis displacement of the screen of the head up display or the viewer. This second axis displacement of the screen of the head up display or the viewer causes a shift displacement of the real object viewed by the viewer through the display region in the second axis direction. According to the present embodiment, the position error of the virtual object caused by the second axis displacement of the screen of the head up display or the viewer is corrected, and therefore the shift in display position incurred by the pitch displacement of the mobile body can be compensated.

Also, in the present embodiment, the display system may include a storage unit that stores a table in which a coordinate in the display image is associated with a movement amount indicating a movement destination of the coordinate, as a warp parameter. The parameter computation unit may shift the movement amount in the table based on the latency compensation parameter, and may output the table in which the movement amount has been shifted as the corrected warp parameter.

In this way, the movement amount in the table is shifted based on the latency compensation parameter, and as a result of performing the warp processing using the corrected table, the latency compensation is realized.

Also, in the present embodiment, the display system may include a storage unit that stores a parameter of a transformation formula for transforming a coordinate in the display image to a coordinate of a movement destination, as a warp parameter. The parameter computation unit may shift the movement destination coordinate based on the latency compensation parameter, and may output the parameter of the transformation formula for obtaining the shifted movement destination coordinate, as the corrected warp parameter.

In this way, the coordinate of a movement destination obtained by the transformation formula is shifted based on the latency compensation parameter, and the warp processing is performed using the corrected transformation formula, and as a result, the latency compensation is realized.

Also, in the present embodiment, the warp processing unit may perform, in the warp processing, the latency compensation processing in which at least one of rotation and scale of the virtual object in the display region is compensated based on the latency compensation parameter.

In this way, the latency compensation by rotation or scaling may be performed in addition to the latency compensation by shift displacement. The scaling is to reduce or zoom the virtual object. According to the present embodiment, the rotation error or the scaling error of the virtual object due to latency, or both of the items can be compensated, and therefore an AR display having higher trackability can be realized.

Also, in the present embodiment, the display system may include a tracking processing unit that generates the tracking information based on an output signal of a motion sensor for detecting a motion of the mobile body. The parameter computation unit may compute the latency compensation parameter using the tracking information based on the output signal of the motion sensor.

As described above, the influence of swaying of the mobile body is considered to be a target of the latency compensation. According to the present embodiment, the latency compensation parameter is computed using the tracking information based on an output signal of the motion sensor for detecting the motion of the mobile body, and therefore the position shift of the virtual object due to swaying of the mobile body can be compensated.

Also, in the present embodiment, the display system may include a processing device that includes the rendering image generation unit and the parameter computation unit, and a head up display controller that includes the warp processing unit.

In this way, the processing device is caused to compute the latency compensation parameter and the corrected warp parameter. With this, a circuit for performing the latency compensation need not be added to the head up display controller, and the latency compensation can be realized without increasing the circuit scale of the head up display controller.

Also, in the present embodiment, the processing device may include an interface. An output signal, of a sensor that is at least one of a first sensor for acquiring two-dimensional information or three-dimensional information of the real object, a second sensor for detecting the motion of the mobile body, and a third sensor for detecting the viewpoint or line of sight direction of the viewer, may be input to the interface. The parameter computation unit may compute the latency compensation parameter using the tracking information based on the output signal of the sensor.

The position shift of the virtual object due to latency is incurred by the change in position or orientation of the real object, mobile body, or viewer. According to the present embodiment, the sensor can detect the change in position or orientation regarding at least one of the real object, mobile body, and viewer. Also, as a result of the parameter computation unit computing the latency compensation parameter using the tracking information based on the output signal of the sensor, the position shift of the virtual object incurred by the change in position or orientation of the real object, mobile body, or viewer can be compensated.

Also, in the present embodiment, the warp processing unit may output frame information indicating a target frame to be processed in the warp processing to the parameter computation unit. The parameter computation unit may compute the latency compensation parameter regarding the latency corresponding to the target frame based on the frame information.

With the configuration of the present embodiment, the parameter computation unit provided in the processing device cannot recognize the display timing unless the information indicating the frame regarding which the warp processing unit provided in the head up display controller performs the warp processing is given. According to the present embodiment, the warp processing unit outputs the frame information indicating the target frame to be processed in the warp processing to the parameter computation unit, and therefore the parameter computation unit can recognize the display timing.

Also, in the present embodiment, the display system may include a processing device that includes the rendering image generation unit, and a head up display controller that includes the parameter computation unit and the warp processing unit.

In this way, the head up display controller can be caused to compute the latency compensation parameter and the corrected warp parameter. Because the communication time for transmitting the corrected warp parameter to the head up display controller is not needed, compared with the case where the processing device is caused to compute the latency compensation parameter and the corrected warp parameter, the latency compensation can be performed using a sensor output at a timing closer to the display timing.

Also, in the present embodiment, the processing device may include a first interface to which an output signal of a sensor for rendering is input. The rendering image generation unit may generate the rendering image based on the tracking information that is based on the output signal of the sensor for rendering. The head up display controller may include a second interface to which an output signal of a sensor for latency compensation that is different from the sensor for rendering and the rendering image are input. The parameter computation unit may compute the latency compensation parameter based on the output signal of the sensor for latency compensation.

In this way, the parameter computation unit can acquire the output signal of the sensor for latency compensation at any timing, and therefore can compute the latency compensation parameter by acquiring the output signal of the sensor for latency compensation at a timing closest to the display timing.

Also, in the present embodiment, the rendering image generation unit may generate the rendering image based on the tracking information at a first timing, and output the tracking information at the first timing to the head up display controller along with the rendering image. The parameter computation unit may compute the latency compensation parameter based on the tracking information at a second timing that corresponds to the display timing of the display image and is after the first timing, and the tracking information at the first timing.

In this way, the latency between the first timing and the display timing is reduced to the latency between the second timing that is after the first timing and the display timing, and therefore the position shift due to latency can be reduced.

Also, an electronic apparatus of the present embodiment includes any of the display systems described above.

Also, a mobile body of the present embodiment includes any of the display systems described above.

Also, a display method of the present embodiment is a display method of a head up display that displays, in a display region, a virtual object corresponding to a real object in the real space. The display method includes generating a rendering image including the virtual object. The display method includes computing a latency compensation parameter for compensating a latency including a rendering processing latency of the rendering image based on tracking information that is at least one of first tracking information of a mobile body in which the head up display is mounted, a second tracking information of a viewer of the head up display, and a third tracking information of the real object. The display method includes generating a display image to be displayed in the display region by performing warp processing in which coordinate transformation is performed on the rendering image according to a curve of the display region. In the warp processing of the display method, latency compensation processing for compensating the position of the virtual object in the display region is performed based on the latency compensation parameter.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the sensor, the head up display, the processing device, the head up display controller, the display system, the electronic apparatus, the mobile body, and the like are not limited to those described in the present embodiment, and various modifications are possible.

What is claimed is:

1. A display system of a head up display that displays, in a display region, a virtual object corresponding to a real object in the real space, the display system comprising:
   a rendering image generation unit configured to generate a rendering image including the virtual object;
   a parameter computation unit configured to compute a latency compensation parameter for compensating a latency including a rendering processing latency of the rendering image based on tracking information that is at least one of first tracking information of a mobile body in which the head up display is mounted, second tracking information of a viewer of the head up display, and third tracking information of the real object; and
   a warp processing unit configured to generate a display image to be displayed in the display region by performing warp processing in which coordinate transformation is performed on the rendering image according to a property of the display region,
   wherein the warp processing unit performs, in the warp processing, latency compensation processing for compensating the position of the virtual object in the display region based on the latency compensation parameter,
   the warp processing unit outputs frame information indicating a target frame to be processed in the warp processing to the parameter computation unit, and
   the parameter computation unit computes the latency compensation parameter regarding the latency corresponding to the target frame based on the frame information.

2. The display system according to claim 1,
   wherein the rendering image generation unit generates the rendering image based on the tracking information at a first timing, and
   the parameter computation unit computes the latency compensation parameter based on the tracking information at a second timing that is after the first timing and before a display timing of the display image and the tracking information at the first timing.

3. The display system according to claim 1,
   wherein the parameter computation unit outputs a corrected warp parameter obtained by correcting a warp parameter of the coordinate transformation according to the property of the display region, based on the latency compensation parameter, and
   the warp processing unit performs the latency compensation processing by performing the warp processing using the corrected warp parameter.

4. The display system according to claim 3,
   wherein the tracking information is information indicating a displacement including at least one of a first axis displacement and a second axis displacement that are perpendicular to a running direction of the mobile body, and
   the parameter computation unit outputs the corrected warp parameter obtained by correcting a position error of the virtual object incurred by the displacement.

5. The display system according to claim 3,
wherein when, out of a first axis displacement and a second axis displacement that are perpendicular to a running direction of the mobile body, the displacement in an up-down direction of the mobile body is the second axis displacement,
the tracking information is information indicating the second axis displacement of the head up display or the viewer due to a pitch displacement of the mobile body, and
the parameter computation unit outputs the corrected warp parameter obtained by correcting a position error of the virtual object incurred by the second axis displacement.

6. The display system according to claim 3, further comprising:
a storage unit that stores a table in which a coordinate in the display image is associated with a movement amount indicating a movement destination of the coordinate, as a warp parameter,
wherein the parameter computation unit shifts the movement amount in the table based on the latency compensation parameter, and outputs the table in which the movement amount has been shifted as the corrected warp parameter.

7. The display system according to claim 3, further comprising:
a storage unit that stores a parameter of a transformation formula for transforming a coordinate in the display image to a coordinate of a movement destination, as a warp parameter,
wherein the parameter computation unit shifts the movement destination coordinate based on the latency compensation parameter, and outputs the parameter of the transformation formula for obtaining the shifted movement destination coordinate, as the corrected warp parameter.

8. The display system according to claim 1,
wherein the warp processing unit performs, in the warp processing, the latency compensation processing in which at least one of rotation and scale of the virtual object in the display region is compensated based on the latency compensation parameter.

9. The display system according to claim 1, further comprising:
a tracking processing unit configured to generate the tracking information based on an output signal of a motion sensor for detecting a motion of the mobile body,
wherein the parameter computation unit computes the latency compensation parameter using the tracking information based on the output signal of the motion sensor.

10. The display system according to claim 1, further comprising:
a processing device that includes the rendering image generation unit and the parameter computation unit, and
a head up display controller that includes the warp processing unit.

11. The display system according to claim 10,
wherein the processing device includes an interface to which an output signal, of a sensor that is at least one of a first sensor for acquiring two-dimensional information or three-dimensional information of the real object, a second sensor for detecting the motion of the mobile body, and a third sensor for detecting the viewpoint or line of sight direction of the viewer, is input, and
the parameter computation unit computes the latency compensation parameter using the tracking information based on the output signal of the sensor.

12. The display system according to claim 1, further comprising:
a processing device that includes the rendering image generation unit, and
a head up display controller that includes the parameter computation unit and the warp processing unit.

13. The display system according to claim 12,
wherein the processing device includes a first interface to which an output signal of a sensor for rendering is input,
the rendering image generation unit generates the rendering image based on the tracking information that is based on the output signal of the sensor for rendering,
the head up display controller includes a second interface to which an output signal of a sensor for latency compensation that is different from the sensor for rendering and the rendering image are input, and
the parameter computation unit computes the latency compensation parameter based on the output signal of the sensor for latency compensation.

14. The display system according to claim 12,
wherein the rendering image generation unit generates the rendering image based on the tracking information at a first timing, and outputs the tracking information at the first timing to the head up display controller along with the rendering image, and
the parameter computation unit computes the latency compensation parameter based on the tracking information at a second timing that corresponds to the display timing of the display image and is after the first timing, and the tracking information at the first timing.

15. An electronic apparatus comprising the display system according to claim 1.

16. A mobile body comprising the display system according to claim 1.

17. A display method of a head up display that displays, in a display region, a virtual object corresponding to a real object in the real space, the display method comprising:
generating a rendering image including the virtual object;
computing a latency compensation parameter for compensating a latency including a rendering processing latency of the rendering image based on tracking information that is at least one of first tracking information of a mobile body in which the head up display is mounted, a second tracking information of a viewer of the head up display, and a third tracking information of the real object; and
generating a display image to be displayed in the display region by performing warp processing in which coordinate transformation is performed on the rendering image according to a property of the display region,
wherein, in the warp processing, latency compensation processing for compensating the position of the virtual object in the display region is performed based on the latency compensation parameter,
in the warp processing, frame information indicating a target frame to be processed in the warp processing is generated, and in the computing of the latency compensation parameter, the latency compensation parameter regarding the latency corresponding to the target frame is computed based on the frame information.

* * * * *